United States Patent
Makarov et al.

(10) Patent No.: US 12,555,761 B2
(45) Date of Patent: Feb. 17, 2026

(54) SAMPLE PROBE SYSTEMS AND ASSOCIATED METHODS

(71) Applicant: Thermo Fisher Scientific (Bremen) GmbH, Bremen (DE)

(72) Inventors: Alexander Makarov, Bremen (DE); Egor Kholomeev, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 339 days.

(21) Appl. No.: 18/474,142

(22) Filed: Sep. 25, 2023

(65) Prior Publication Data

US 2025/0104989 A1   Mar. 27, 2025

(51) Int. Cl.
*H01J 49/04* (2006.01)

(52) U.S. Cl.
CPC .................. *H01J 49/0463* (2013.01)

(58) Field of Classification Search
USPC ........................................................ 250/288
See application file for complete search history.

(56) References Cited

U.S. PATENT DOCUMENTS

| | | |
|---|---|---|
| 8,384,020 B2 | 2/2013 | Jesse et al. |
| 8,829,426 B2 | 9/2014 | Vertes et al. |
| 9,048,079 B2 | 6/2015 | Krutchinsky et al. |
| 9,396,917 B2 | 7/2016 | Rauschenbach et al. |
| 9,805,921 B2 | 10/2017 | O'Brien et al. |
| 2016/0260598 A1* | 9/2016 | Loboda ............... H01J 49/105 |
| 2016/0336157 A1 | 11/2016 | Brown et al. |
| 2019/0180996 A1* | 6/2019 | Loboda ............... H01J 49/105 |
| 2020/0015717 A1† | 1/2020 | Taghioskoui |

(Continued)

FOREIGN PATENT DOCUMENTS

| | | |
|---|---|---|
| CN | 204905212 U | 12/2015 |
| GB | 2522801 A | 5/2015 |

(Continued)

OTHER PUBLICATIONS

He et al., "Air flow assisted ionization for remote sampling of ambient mass spectrometry and its application", *Rapid Commun. Mass Spectrom.* Jan. 2011, 25, 843-850.

(Continued)

*Primary Examiner* — Kiet T Nguyen
(74) *Attorney, Agent, or Firm* — Klarquist Sparkman, LLP

(57) ABSTRACT

In an example, a system includes a sample transfer assembly configured to convey ablated material from a sample to an analyzer inlet of an ion analyzer. The sample transfer assembly includes a sample transfer pipe and one or more gas inlets, each configured to receive a respective gas flow. A mass flow rate into the analyzer inlet is equal to or greater than a total mass flow rate of the gas flows into the one or more gas inlets. In another example, a method includes entraining ablated material in a sample material flow that flows within a sample transfer assembly, ionizing the ablated material, and conveying the ionized sample particles to an analyzer inlet of an ion analyzer. In another example, a computer-readable medium includes stored processor-executable instructions that, when executed by a processor, cause the processor to regulate a flow rate of a sample material flow.

20 Claims, 8 Drawing Sheets

(56) References Cited

U.S. PATENT DOCUMENTS

2020/0350150 A1    11/2020   Kaushal et al.
2023/0215714 A1*   7/2023    Carew ................... G01N 27/64
                                                           250/288

FOREIGN PATENT DOCUMENTS

| KR | 101955187 B1 | 3/2019 |
|----|--------------|--------|
| WO | WO2015031321 A1 | 3/2015 |
| WO | WO2021/104855 A1 | 6/2021 |

OTHER PUBLICATIONS

Kim et al., "Atmospheric pressure mass spectrometric imaging of live hippocampal tissue slices with subcellular spatial resolution", *Nature Communications*, Jan. 2017, 8:2113 (13 pages).

P.C. Kooijman, S. Lamprecht, M. Lamshoeft, B. Beine, B.J.H.T. Verhoeven, S.R. Ellis, R.M.A. Heeren, "A novel dual ionization modality source for infrared laser ablation postionization mass spectrometry imaging to study fungicide metabolism and transport", *International Journal of Mass Spectrometry*, Jul. 2021, https://doi.org/10.1016/j.ijms.2021.116602.

Ovchinnikova et al., "Atomic Force Microscope Controlled Topographical Imaging and Proximal Probe Thermal Desorption/Ionization Mass Spectrometry Imaging", *Anal. Chem.* Dec. 2013, 86, 1083-1090.

Luo et al., "Air Flow-Assisted Ionization Imaging Mass Spectrometry Method for Easy Whole-Body Molecular Imaging under Ambient Conditions", *Anal. Chem.* Feb. 2013, 85, 2977-2982.

Combined Search and Examination Report under Sections 17 and 18(3) dated Mar. 18, 2025, from Application No. GB2413946.1, 9 pages.

\* cited by examiner
† cited by third party

SAMPLE PROBE SYSTEMS AND ASSOCIATED METHODS

FIELD

The present disclosure relates generally to sample probe systems for ionization and transport of samples for analysis by ion analyzers, and associated methods.

BACKGROUND

In recent years, air-flow assisted ion sources for mass spectrometry have become popular, such as in the form of laser-ablation electrospray ionization (e.g. MALDESI), air-flow assisted desorption electrospray ionization (AFA DESI), atmospheric pressure plasma assisted laser desorption and ionization (AP PALDI), atmospheric pressure chemical ionization (APCI), and thermal desorption with APCI. However, the sensitivity of such ion sources remains low due to high ion losses between the sample and the mass spectrometer.

SUMMARY

Sample probe systems and associated methods are disclosed herein.

In a representative example, a system includes a sample transfer assembly configured to receive ablated material ejected from a sample and to convey the ablated material to an ion analyzer. The sample transfer assembly includes a sample transfer pipe configured to convey the ablated material to an analyzer inlet of the ion analyzer and one or more gas inlets disposed upstream of the analyzer inlet. Each gas inlet is configured to receive a respective gas flow that flows toward the analyzer inlet and that transports the ablated material toward the analyzer inlet. The sample transfer assembly is configured such that a mass flow rate into the analyzer inlet is equal to or greater than a total mass flow rate of the gas flows into the one or more gas inlets.

In another representative example, a method includes ablating a sample to produce ablated material and entraining the ablated material in a sample material flow that includes the ablated material and that flows within a sample transfer assembly. The method additionally includes ionizing the ablated material to produce ionized sample particles and conveying the ionized sample particles to an analyzer inlet of an ion analyzer such that a mass flow rate into the analyzer inlet is equal to or greater than a mass flow rate of the sample material flow. The entraining the ablated material in the sample flow includes flowing a downstream inlet gas flow into the analyzer inlet to at least partially induce the sample material flow. The entraining the ablated material in the sample material flow is performed such that the sample material flow is laminar within at least a portion of the sample transfer assembly.

In another representative example, a computer-readable medium includes stored processor-executable instructions that, when executed by a processor, cause the processor to regulate a flow rate of a sample material flow. The sample material flow is induced to flow within a sample transfer assembly by at least a sampling capillary gas flow and a downstream inlet gas flow such that the sample material flow is laminar within at least a portion of the sample transfer assembly. The sample material flow includes ablated material that is ablated from a sample and entrained into the sample material flow and that is directed into an analyzer inlet of an ion analyzer. The regulating the flow rate is performed such that a mass flow rate into the analyzer inlet is equal to or greater than a total mass flow rate of the sampling capillary gas flow and the downstream inlet gas flow.

The foregoing and other objects, features, and advantages of the disclosed technology will become more apparent from the following detailed description, which proceeds with reference to the accompanying figures.

DETAILED DESCRIPTION

Figure 1A:
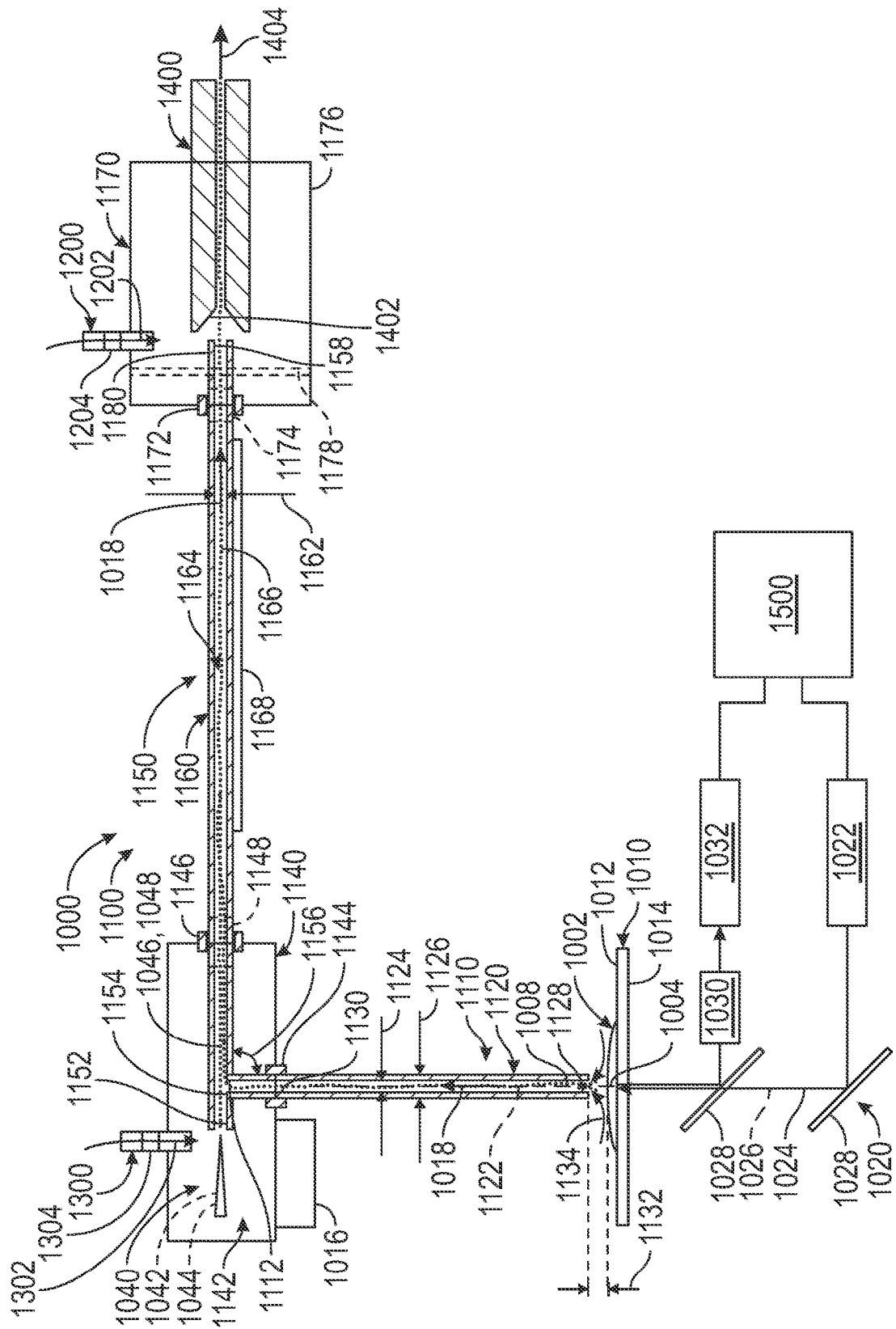
FIG. 1A is a schematic illustration of a sample probe system according to an example.

The present disclosure generally is directed to systems and methods for ionizing a sample material for analysis by an ion analyzer, such as a mass spectrometer (MS). Such systems and methods can facilitate ionizing a sample material that is entrained in a gas flow and/or conveying such sample material to the ion analyzer in a manner that enhances transport efficiency. In particular, and as described in more detail below, such systems and methods can operate at low pressure (e.g., at or below atmospheric pressure) to entrain ablated sample material into a laminar flow that can facilitate turbulence-free mixing with an ionizing material. Such systems and methods also can use a variety of gas inlets, including passive and/or regulated gas inlets, to entrain the ablated sample material into a flow that flows into the ion analyzer with very little and/or minimal loss of sample material.

In recent years, air-flow assisted ion sources for mass spectrometry have become popular, such as in the form of laser-ablation electrospray ionization (e.g. MALDESI), air-flow assisted desorption electrospray ionization (AFA DESI), atmospheric pressure plasma assisted laser desorption and ionization (AP PALDI), atmospheric pressure chemical ionization (APCI), and thermal desorption with APCI. Such techniques typically entrain an aerosol formed at a tissue sample into a gas flow driven by a Venturi pump or an additional vacuum pump and subject the sample to post-ionization before entering the mass spectrometer (MS). The sensitivity of such ion sources remains low due to high ion losses between the sample and the MS.

Many ion sources operate to direct a pumped gas flow as close to the MS entrance as possible, relying on suction through an MS transfer tube or opening orifice. Such approaches are simple but limit the apparatus distance to the sample and the flow velocity in the system, thus limiting the minimum sample size and particle size of the aerosolized sample.

Additionally, many prior systems rely upon a suction and/or vacuum source to draw ablated sample material toward the MS entrance. In such systems, the suction source also diverts a portion of the ablated sample material away from the MS entrance and into the suction source, resulting in loss of sample material and perturbation of the flow of ablated sample material into the MS entrance.

By contrast, sample probe systems according to the present disclosure can enhance ionization and transport efficiency by first entraining a sample aerosol into a sample transfer assembly with a high average velocity, reducing the thickness of the boundary layer within the sample transfer assembly. Such systems also can produce turbulence-free mixing of the sample aerosol with an ionizing material produced by an ion source.

In particular, and as described in more detail below, sample probe systems according to the present disclosure can include one or more gas inlets disposed upstream of an analyzer inlet of an ion analyzer (e.g., a mass spectrometer) and configured to receive respective gas flows for transporting ablated material to the analyzer inlet. In contrast to prior systems in which a portion of the sample material flow is diverted away from the analyzer inlet by a suction source, one or more of the gas inlets can receive a flow that flows into the analyzer inlet at least substantially in its entirety. In this manner, all of the gas flows used for transport of ablated sample material are not higher than the flow into the analyzer inlet. Stated differently, the mass flow into the analyzer inlet can be equal to or greater than the mass flows used to entrain the ablated sample material. Accordingly, sample probe systems according to the present disclosure can operate to draw into the analyzer inlet all of the flow that delivers the ablated sample material, as well as additional optional flows for focusing the flow of ablated sample material. Sample probe systems according to the present disclosure thus can operate to transport ablated sample material to an ion analyzer in a controllable manner and with a high degree of transport efficiency.

FIG. 1A illustrates an example of a sample probe system 1000, which also may be referred to as an ion source 1000. As shown in FIG. 1A, the sample probe system 1000 includes a sample transfer assembly 1100 configured to receive ablated material 1008 that is ejected from a sample 1002 and to convey the ablated material 1008 to an ion analyzer 1400. The ablated material 1008 can include and/or be aerosolized particles that are ejected from the sample 1002. Accordingly, the ablated material 1008 additionally or alternatively may be referred to as a sample aerosol 1008. The sample 1002 can include and/or be any of a variety of materials to be analyzed by the ion analyzer 1400. In particular, the sample 1002 can include and/or be an organic and/or biological sample, such as tissue or live cells.

As described in more detail below, the sample probe system 1000 generally is configured to convey the ablated material 1008 through the sample transfer assembly 1100 by entraining the ablated material 1008 in one or more gas flows introduced into the sample transfer assembly 1100. Accordingly, references herein to a flow of the ablated material 1008 through the sample transfer assembly 1100 also may be understood as referring to a flow of the gas that carries the ablated material 1008 through the sample transfer assembly. As shown in FIG. 1A, the flow of the ablated material 1008 and/or accompanying gases through the sample transfer assembly 1100 may be referred to as a sample material flow 1018.

The ion analyzer 1400 can include and/or be any of a variety of systems and devices, such as a mass spectrometer. As more specific examples, the ion analyzer 1400 can include and/or be a time of flight (TOF) mass spectrometer, an Orbitrap™ mass spectrometer, a linear ion trap mass spectrometer, a quadrupole mass spectrometer, a quadrupole ion trap mass spectrometer, a magnetic sector mass spectrometer, and/or a Fourier transform ion cyclotron resonance (FTICR) mass spectrometer. This is not required of all examples, however, and it additionally is within the scope of the present disclosure that the ion analyzer 1400 can be any other suitable system and/or device, examples of which include an optical spectrometer, a PCR machine, and/or a sequencing machine.

The sample transfer assembly 1100 includes a sample transfer pipe 1160 configured to convey the ablated material 1008 to an analyzer inlet 1402 of the ion analyzer 1400. In the example of FIG. 1A, the sample transfer assembly 1100 additionally includes a sampling capillary 1120 configured to receive the ablated material 1008 and to convey the ablated material 1008 to the sample transfer pipe 1160. In particular, in this example, the sampling capillary 1120 is positioned adjacent to the sample 1002 to receive the ablated material 1008 and to convey the ablated material 1008 to the sample transfer pipe 1160, which in turn conveys the ablated material 1008 to the ion analyzer 1400.

The sample probe system 1000 generally is configured to ionize the ablated material 1008 such that the ablated material 1008 is conveyed to the ion analyzer 1400 in an ionized state. In particular, in various examples, the ablated material 1008 is ionized by and/or within the sample transfer assembly. For example, as shown in FIG. 1A, the sample probe system 1000 can include an ionizing unit 1040 configured to ionize the ablated material 1008. In some examples, the ionizing unit 1040 is configured to introduce an ionizing material 1046 into a flow of the ablated material 1008, such as within the sample transfer pipe 1160, such that the ablated material 1008 is ionized via charge transfer with the ionizing material 1046.

The sample probe system 1000 can be configured to produce the ablated material 1008 in any of a variety of manners. For example, and as shown in FIG. 1A, the sample probe system 1000 can include an optical assembly 1020 with a laser source 1022 configured to direct a laser beam 1024 to a targeted region 1004 of the sample 1002. In this manner, the laser source 1022 can operate to ablate and/or aerosolize the sample 1002 within the targeted region 1004.

As shown in FIG. 1A, the optical assembly 1020 can be configured to direct the laser beam 1024 to an opposite side of the sample 1002 than that at which the sampling capillary 1120 receives the ablated material 1008. For example, the sample probe system 1000 can include a sample stage 1010 with a first side 1012 and a second side 1014 opposite the first side 1012. The first side 1012 can be configured for placement of the sample 1002 thereon, and the optical assembly 1020 can be configured to direct the laser beam 1024 to the second side 1014 of the sample stage 1010. Such a configuration may facilitate positioning the sampling capillary 1120 arbitrarily close to the sample 1002 without spatial constraints imposed by the optical assembly 1020. While the present disclosure generally is directed to examples in which the laser beam 1024 and the sampling capillary 1120 approach the sample 1002 from opposite sides of the sample stage 1010, this is not required of all examples, and it is to be understood that same-side ablation also is possible.

The laser source 1022 can include and/or be any of a variety of laser sources operable to ablate the sample 1002 as described herein. For example, the laser source 1022 can include and/or be a femtosecond laser source, and/or the laser beam 1024 can include and/or be an infrared laser beam. In some examples, the laser source 1022 can be configured to deliver pulse energies of approximately 1 nanojoule (nJ) to approximately 10 microjoules (µJ) per cubic micrometer (µm$^3$) of the sample 1002.

The targeted region 1004 of the sample 1002 targeted by the laser beam 1024 can have any of a variety of dimensions. As examples, the targeted region 1004 can have a diameter that is at least 1 µm, at least 5 µm, at least 10 µm, at least 15 µm, at least 20 µm, at least 30 µm, at most 50 µm, at most 25 µm, at most 17 µm, at most 12 µm, at most 7 µm, at most 2 µm, 1-7 µm, 5-12 µm, 10-17 µm, 15-25 µm, and/or 20-50 µm. Additionally or alternatively, the targeted region 1004 can have a volume that is at least 2 µm$^3$, at least 5 µm$^3$, at least 10 µm$^3$, at least 50 µm$^3$, at least 100 µm$^3$, at least 300 µm$^3$, at most 500 µm$^3$, at most 200 µm$^3$, at most 70 µm$^3$, at most 20 µm$^3$, at most 7 µm$^3$, at most 3 µm$^3$, 2-7 µm$^3$, 5-20 µm$^3$, 10-70 µm$^3$, 50-200 µm$^3$, and/or 100-500 µm$^3$.

In some examples, and as shown in FIG. 1A, the optical assembly 1020 additionally can include a sample imaging device 1032 configured to image a portion of the sample 1002. In some such examples, the sample imaging device 1032 can be configured to image the sample 1002 along a similar direction as that by which the laser beam 1024 approaches the sample 1002. For example, the optical assembly 1020 can be configured to direct the laser beam 1024 to the sample 1002 at least partially along a beam axis 1026, and the sample imaging device 1032 can be configured to receive light from the sample 1002 at least partially along the beam axis 1026.

As shown in FIG. 1A, the optical assembly 1020 can include one or more mirrors 1028, such as to direct the laser beam 1024 toward the sample 1002 and/or to direct light from the sample 1002 away from the beam axis 1026. In some examples, the optical assembly 1020 additionally includes an objective 1030 configured to collect light from the sample 1002 for imaging by the sample imaging device 1032.

Additional examples of optical assemblies and/or of components thereof that are suitable for use with examples taught herein are disclosed in PCT Patent Application Publication No. WO2021/1048555 and in U.S. Patent Application Publication No. 2022/0399197, the complete disclosures of which are incorporated by reference herein.

The sample probe system 1000 can incorporate the ionizing unit 1040 in any of a variety of manners. For example, in the example of FIG. 1A, the sample probe system 1000 is configured such that the ablated material 1008 mixes with the ionizing material 1046 within the sample transfer pipe 1160 to ionize the ablated material 1008. In this manner, the ionizing unit 1040 can operate to produce a flow of ionized sample particles 1166 that flow to the ion analyzer 1400. In such examples, the sample transfer pipe 1160 may be described as including a charge transfer region 1164 in which the ablated material 1008 is mixed with the ionizing material 1046. In some examples, the sample material flow 1018 may be described as including the ionized sample particles 1166 and/or the ionizing material 1046.

In some examples, and as shown in FIG. 1A, the sample transfer assembly 1100 additionally may include a sample transfer pipe heater 1168 that is thermally coupled to the sample transfer pipe 1160. The sample transfer pipe heater 1168 can be configured to regulate a temperature of the sample transfer pipe 1160 and/or of the charge transfer region 1164, such as to regulate and/or enhance an ionization rate of the ablated material 1008 within the charge transfer region 1164. In some examples, and as shown in FIG. 1A, the sample transfer pipe heater 1168 is directly coupled to (e.g., wrapped around) the sample transfer pipe 1160, such as to heat the sample transfer pipe 1160 via conductive heat transfer. In other examples, the sample transfer pipe heater 1168 can be spaced apart from the sample transfer pipe 1160, such as to heat the sample transfer pipe 1160 via convective and/or radiative heat transfer, and/or may be thermally coupled to the sample transfer pipe 1160 via one or more intermediate components.

In the present disclosure, the term "ionized sample particles" generally refers to ablated material 1008 that has been ionized, such as by the ionizing unit 1040. Accordingly, references herein to the ablated material 1008 may be understood as including the ionized sample particles 1166 formed by ionizing the ablated material 1008. Similarly, references herein to the ionized sample particles 1166 may be understood as including the ablated material 1008 (e.g., subsequent to ionization).

FIG. 1A illustrates an example in which the ionizing unit 1040 includes and/or is an electrospray needle 1042, and in which the ionizing material 1046 includes and/or is a spray of electrospray droplets 1048 generated by the electrospray needle 1042. This is not required of all examples, however, and it also is within the scope of the present disclosure that the ionizing unit 1040 additionally or alternatively can include and/or be any of a variety of ionizing units known to the art of ion analysis. As examples, the ionizing unit 1040 also can include and/or be an atmospheric-pressure chemical ionization (APCI) source, a low-temperature plasma source, a glow discharge source, a dielectric barrier discharge source, a high-energy photon source, a high-energy electron source, etc. As an example, FIG. 1A additionally represents an example in which the ionizing unit 1040 includes and/or is a corona discharge needle 1044 of an APCI source.

The sample probe system 1000 can be configured to entrain the ablated material 1008 to the sample material flow 1018 through the sample transfer assembly 1100 in any of a variety of manners. The sample probe system 1000 generally includes one or more gas inlets that can operate to introduce corresponding gas flows into the sample transfer assembly 1100 to draw the ablated material 1008 into the sample transfer assembly 1100 and/or to direct the flow of the ablated material 1008 through the sample transfer assembly 1100.

In particular, and as shown in FIG. 1A, the sample probe system 1000 includes a first gas inlet 1200 configured to receive a first gas flow 1202, at least a portion of which flows into the analyzer inlet 1402. The first gas flow 1202 may be drawn through the first gas inlet 1200 in any of a variety of manners. For example, and as shown in FIG. 1A, the ion analyzer 1400 can be configured to generate a motive gas flow 1404 (e.g., that is generated downstream of the analyzer inlet 1402) that operates to draw a flow of gas into the analyzer inlet 1402, thereby inducing the first gas flow 1202 to flow through the first gas inlet 1200 and into the analyzer inlet 1402. In particular, the motive gas flow 1404 can yield a pressure within the analyzer adapter unit 1170 that is substantially below atmospheric pressure, thus drawing gas into the analyzer inlet 1402 via the first gas inlet 1200 and/or via the sample transfer pipe 1160.

The first gas inlet 1200 is disposed downstream of the sample transfer pipe 1160, and thus at least partially induces a flow of gas through the sample transfer pipe 1160 toward the analyzer inlet 1402. The flow of gas out of the sample transfer pipe 1160 carries the ablated material 1108 (e.g., in the form of the ionized sample particles 1166), which flows into the analyzer inlet 1402 with the first gas flow 1202. Such a configuration can facilitate directing the ablated material 1108 and/or ionized sample particles 1166 to flow into the analyzer inlet 1402 with a high degree of efficiency. In general, various gas flows are controlled by a cross-sectional area and pressure differential in the corresponding part of the system.

As used herein, terms such as "first," "second," "third," etc., as used to label components and/or features of the sample probe system 1000 (e.g., the first gas inlet 1200), are to be understood as labeling distinct and/or separate components and/or features without suggesting or requiring a corresponding sequence and/or priority among such components and/or features.

As used herein, the term "efficiency," as used to characterize transport of the ablated material 1108 and/or the ionized sample particles 1166, generally refers to a proportion of the ablated material 1108 drawn into the sample transfer assembly 1100 that subsequently is received by the ionizing unit 1040. As an example, the sample probe system 1000 can be configured such that the first gas flow 1202 at least partially entrains the ablated material 1008 and/or the ionized sample particles 1166 to flow into the analyzer inlet 1402 such that at least 50% of the ablated material 1008 that enters the sample transfer pipe 1160 continues to flow into the analyzer inlet 1402. As more specific examples, the sample probe system 100 can be configured such that a proportion of the ablated material 1008 entering the sample transfer pipe 1160 that continues to flow into the analyzer inlet 1402 is at least 50%, at least 60%, at least 70%, at least 80%, at least 90%, 50-99%, 60-99%, 70-99%, 80-99%, and/or 90-99%.

By contrast, other ion transfer systems operate to flow ablated and/or ionized sample material into an analyzer inlet by drawing a motive flow away from a region between an ion transfer tube and the analyzer inlet (e.g., with a vacuum), thus discarding a portion of the sample material with the motive flow and potentially disrupting ion transport in the process. Because the motive gas flow 1404 is initiated downstream of the analyzer inlet 1402 such that the first gas flow 1202 flows into the analyzer inlet 1402, sample probe systems according to the present disclosure thus enable ion transfer with enhanced efficiency relative to other systems.

Sample probe systems according to the present disclosure additionally may be configured to enhance an ion transfer efficiency thereof via control and/or configuration of flow and/or mixing dynamics within the sample transfer assembly 1100. For example, the sample probe system 1000 may be configured to flow the ablated material 1008 through the sampling capillary 1120 and/or through the sample transfer pipe 1160 predominantly and/or exclusively with a laminar flow profile. In particular, in some examples, the sample probe system 1000 can be configured such that, during operative use of the sample transfer system 1000, the sample material flow 1018 is constrained to flow with a Reynolds number that does not exceed a laminar-turbulent transition of flow within some or all pipes of the system. For example, the sample probe system 1000 can be configured such that the Reynolds number associated with the sample material flow 1018 is less than 2300. The sample material flow 1018 also may be configured to reduce an extent to which the ablated material 1008 interacts with and/or adheres to inner walls of the sampling capillary 1120 and/or the sample transfer pipe 1160 in a manner that could reduce a transfer efficiency of the sample probe system 1000.

In some examples, such flow characteristics are at least partially based upon a geometrical configuration of components of the sample transfer assembly 1100. For example, and as shown in FIG. 1A, the sampling capillary 1120 and the sample transfer pipe 1160 (and/or the central axes thereof) may be angled relative to one another by a capillary intersection angle 1156 that is approximately 90°. In particular, such a configuration may facilitate injecting a flow of the ablated material 1008 into a flow of the ionizing material 1046 in a manner that promotes mixing of the ablated material 1008 and the ionizing material 1046 while at least substantially preserving a laminar flow through the sample transfer pipe 1160 and/or through the charge transfer region 1164.

Additionally, various flow characteristics through the sample transfer assembly 1100 can be at least partially based upon various dimensions of components of the sample transfer assembly 1100. For example, and as shown in FIG. 1A, the sampling capillary 1120 can have a sampling capillary inner diameter 1124 that is selected and/or configured to produce desirable flow characteristics of the ablated material 1008 within the sampling capillary 1120. As examples, the sampling capillary inner diameter 1124 may be at least 0.5 millimeters (mm), at least 1 mm, at least 1.5 mm, at least 2 mm, at least 3 mm, at most 5 mm, at most 2.5 mm, at most 1.7 mm, at most 1.2 mm, at most 0.7 mm, 0.5-1.7 mm, 1-2.5 mm, and/or 1.5-5 mm.

In some examples, the sampling capillary inner diameter 1124 is significantly greater than a diameter of the targeted region 1004, which can be (for example) approximately 1-50 micrometers (μm). In particular, in view of the small spot size of the targeted region 1004 relative to the sampling capillary inner diameter 1124, a sampling capillary 1120 with a sampling capillary inner diameter 1124 multiple orders of magnitude larger than the spot size can effectively receive the ablated material 1008 produced at the targeted region 1004 while maintaining a relatively low flow rate within the sampling capillary 1120. For example, the flow rate within the sampling capillary 1120 can be less than about 5-15 meters per second (m/s), resulting in a gas flow rate that is sufficiently low (e.g., below about 30 milliliters per second (mL/s)) to entrain sample particles greater than 100 nanometers (nm) in diameter in a laminar flow. By contrast, inlet flows of commercially available systems routinely reach flow rates of over 120 mL/s, which can limit a maximum size of the sample particles that can be entrained in a laminar flow within the ion source.

As a result of the relatively low flow rates associated with laminar flows in sample probe systems according to the present disclosure, such systems can introduce one or more gas inflows into the sample probe system and to direct such flows into the analyzer inlet 1402. Examples of such gas inflows include the first gas flow 1202, second and/or third gas flows as described below, focusing and/or curtaining gas flows, etc. Such flows can be directed into the analyzer inlet 1402 without the use of a suction pump that diverts flow away from the analyzer inlet 1402 and/or without adjustment of the analyzer inlet 1402. Thus, the mass flow can be balanced in such a way to achieve transfer of the ablated material 1008 to the analyzer inlet 1402 with high efficiency. The versatility in balancing the flow rates as described herein also can allow for higher flow rates to be used in the sampling capillary 1120 to entrain particles with a size on the order of single nanometers.

In the present disclosure, the term "flow rate," as used to describe a flow of gas and/or material (e.g., the ablated material 1008), may be understood as representing any of a variety of quantities. For example, in some cases, the term "flow rate" may refer to a velocity (e.g., an average velocity) of a gas and/or of a material entrained in the gas at a selected location within the sample transfer assembly 1100. In such cases, a flow rate may be expressed in units of distance per time interval. In other cases, the term "flow rate" may refer to a volumetric flow rate of gas and/or entrained material passing through a portion of the sample transfer assembly 1100 (e.g., through a selected cross-sectional area of a conduit of the sample transfer assembly 1100), and thus may be expressed in units of volume per unit time. In still other cases, the term "flow rate" may refer to a mass flow rate of gas and/or entrained material passing through a portion of the sample transfer assembly 1100 (e.g., through a selected cross-sectional area of a conduit of the sample transfer assembly 1100), and thus may be expressed in units of mass per unit time.

As another example, and as shown in FIG. 1A, the sampling capillary 1120 can include a sampling capillary inlet 1128 that is separated from the sample 1002 by a sample separation distance 1132 that is selected and/or configured to produce desirable flow characteristics of the ablated material 1008 into the sampling capillary 1120. As examples, the sample separation distance 1132 may be at least 0.1 mm, at least 0.5, at least 1 mm, at least 1.5 mm, at least 2 mm, at least 3 mm, at most 5 mm, at most 2.5 mm, at most 1.7 mm, at most 1.2 mm, at most 0.7 mm, r at most 0.2 mm, 0.1-0.7 mm, 0.5-1.2 mm, 1-1.7 mm, 1.5-2.5 mm, and/or 2-5 mm. As discussed in more detail below, the sample separation distance 1132 can be configured and/or varied to regulate dynamics of a flow into the sampling capillary inlet 1128.

One or more characteristics of the sample transfer pipe 1160 also may be selected and/or configured to produce desirable flow characteristics of the ablated material 1008 and/or of the ionizing material 1046. For example, and as shown in FIG. 1A, the sample transfer pipe 1160 can have a sample transfer pipe inner diameter 1162 that is at least 0.5 mm, at least 1 mm, at least 1.5 mm, at least 2 mm, at least 3 mm, at most 5 mm, at most 2.5 mm, at most 1.7 mm, at most 1.2 mm, at most 0.7 mm, 0.5-1.2 mm, 1-1.7 mm, 1.5-2.5 mm, and/or 2-5 mm.

The sample probe system 1000 may be configured to enable control of gas flow rates into the sample transfer assembly 1100 in any of a variety of manners. In some examples, and as shown in FIG. 1A, the sample probe system 1000 include a first regulator mechanism 1204 configured to selectively regulate a first flow rate at which the first gas flow 1202 flows into and/or through the first gas inlet 1200. In such examples, selective regulation of the first flow rate can facilitate controlling one or more characteristics of a flow of the ablated material 1008 into the analyzer inlet 1402. For example, selectively increasing the first flow rate with the first regulator mechanism 1204 can operate to decrease a flow rate of the ablated material 1008 out of the sample transfer pipe 1160.

The sample probe system 1000 also may include additional gas inlets for inducing and/or entraining the sample material flow 1018 through the sample transfer assembly 1100. For example, and as shown in FIG. 1A, the sample probe system 1000 can include a second gas inlet 1300 configured to receive a second gas flow 1302 that flows into the sample transfer pipe 1160. In the example of FIG. 1A, the second gas inlet 1300 is disposed upstream of the sample transfer pipe 1160, and thus upstream of the charge transfer region 1164 within the sample transfer pipe 1160. Similar to the first gas flow 1202, the second gas flow 1302 may be induced to flow through the second gas inlet 1300 by one or more gas flows downstream of the second gas inlet, such as by the motive gas flow 1404 and/or by the first gas flow 1202.

In some examples, and as shown in FIG. 1A, the sample probe system 1000 includes a second regulator mechanism 1304 configured to selectively regulate a second flow rate at which the second gas flow 1302 flows into and/or through the second gas inlet 1300. In such examples, selective regulation of the second flow rate can facilitate controlling one or more characteristics of the ionization of the ablated material 1008. For example, selectively increasing the second flow rate can increase a flow rate of the ionizing material 1046 into the sample transfer pipe 1160 and/or charge transfer region 1164, but also may undesirably introduce turbulence in the dynamics of the mixing of the ablated material 1008 and the ionizing material 1046.

When present, each of the first regulator mechanism 1204 and the second regulator mechanism 1304 can include and/or be any suitable mechanisms, examples of which include valve-based regulators, variable-aperture regulators, diaphragm-based regulators, etc. In some examples, the first regulator mechanism 1204 and/or the second regulator mechanism 1304 may be selectively, actively, and/or dynamically controlled via any suitable combination of manual and/or automated inputs, as described in more detail below.

The sample probe system 1000 additionally may be described as operating to draw a third gas flow 1134 into the sample transfer assembly 1100 as the ablated material 1008 is drawn into the sample transfer assembly 1100. For example, and as shown in FIG. 1A, the third gas flow 1134 can flow into the sampling capillary inlet 1128 to entrain the ablated material 1008 to flow within the sample transfer assembly 1100. In this manner, the sampling capillary inlet 1128 can be described as representing a gas inlet of the sample transfer assembly 1100. Similar to the first gas flow 1202 and/or the second gas flow 1302, the third gas flow 1134 may be induced to flow through the sampling capillary inlet 1128 by one or more gas flows downstream of the sampling capillary inlet 1128, such as by the motive gas flow 1404, by the first gas flow 1202, and/or by the second gas flow 1302.

In some examples, the sample probe system 1000 can be configured to selectively regulate a third flow rate at which the third gas flow 1134 flows into the sampling capillary 1120, such as by controlling a position of the sampling capillary 1120 relative to the sample 1002. For example, and as shown in FIG. 1A, the sample probe system 1000 can include a capillary positioning stage 1016 configured to selectively control a position of the sampling capillary 1120 relative to the sample 1002, such as by translating and/or rotating the sampling capillary 1120 relative to the sample 1002. In this manner, the capillary positioning stage 1016 may be configured to selectively vary the sample separation distance 1132 between the sampling capillary inlet 1128 and the sample 1002, which in turn may operate to regulate the third flow rate of the third gas flow 1134 into the sampling capillary 1120. For example, translating the sampling capillary 1120 with the capillary positioning stage 1016 to increase the sample separation distance 1132 can operate to increase the third flow rate, but also may limit a proportion of the ablated material 1008 ejected from the sample 1002 that is entrained to flow within the sample transfer assembly 1100. In various examples, it can be desirable to increase the third flow rate to increase a flow rate of the ablated material 1008 through the sampling capillary 1120, thus reducing travel time along the sampling capillary 1120. Additionally or alternatively, it can be desirable that the third flow rate be sufficiently high to effectively inject the flow of the ablated material 1008 into the flow of the ionizing material 1046 to facilitate effective mixing of the ablated material 1008 and the ionizing material 1046.

Figure 1B:
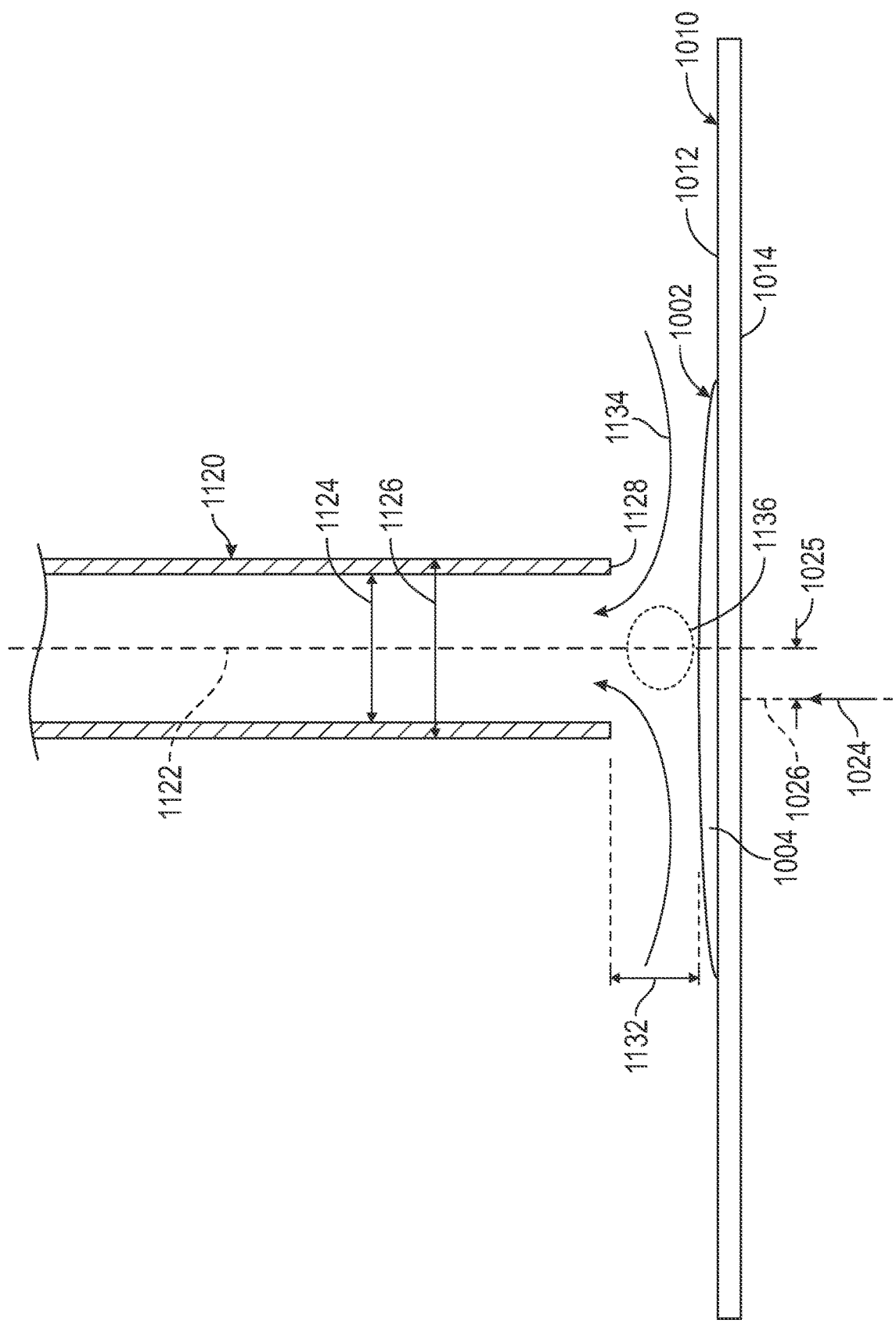
FIG. 1B is an illustration of a region of the sample probe system of FIG. 1A.

FIG. 1B illustrates a portion of the sample probe system 1000 of FIG. 1A near the sampling capillary inlet 1128. In some examples, and as shown in FIG. 1B, a lateral position of the sampling capillary inlet 1128 relative to the sample 1002 and/or relative to the beam axis 1026 of the laser beam 1024 also can be adjusted to enhance properties of a flow of the ablated material 1008 into the sampling capillary 1120. For example, the sampling capillary 1120 can extend along and define a sampling capillary central axis 1122, and the beam axis 1026 and/or the targeted region 1004 of the sample 1002 can be spaced apart from the sampling capillary central axis 1122 by a lateral beam offset 1025.

Offsetting the sampling capillary central axis 1122 from the beam axis 1026 by the lateral beam offset 1025 in this manner can facilitate generating a plume of ablated material 1008 in a region in which entrainment into the third gas flow 1134 is enhanced and/or maximized. In particular, and as shown in FIG. 1B, the third gas flow 1134 can flow into the sampling capillary inlet 1128 with a velocity profile that yields a stagnation region 1136 along the sampling capillary central axis 1122 and/or near the sample 1002. When ablated material 1008 is generated within the stagnation region 1136, such material may not be effectively drawn into the sampling capillary 1120 by the third gas flow 1134. Alternatively, displacing the beam axis 1026 from the sampling capillary central axis 1122 by the lateral beam offset 1025 can result in generation of the ablated material 1008 in a region of relatively high velocity of the third gas flow 1134 into the sampling capillary 1120.

The lateral beam offset 1025 can assume any of a variety of values, such as may be at least partially based upon a dimension of the sampling capillary 1120. As examples, the lateral beam offset 1025 can be at least 0.2 mm, at least 0.5 mm, at least 1.0 mm, at most 1.5 mm, at most 0.7 mm, at most 0.3 mm, 0.2-0.7 mm, and/or 0.5-1.5 mm. Additionally or alternatively, the lateral beam offset 1025 can be at least 10% of the sampling capillary inner diameter 1024, at least 20% of the sampling capillary inner diameter 1024, at least 30% of the sampling capillary inner diameter 1024, at least 40% of the sampling capillary inner diameter 1024, at most 45% of the sampling capillary inner diameter 1024, at most 35% of the sampling capillary inner diameter 1024, at most 25% of the sampling capillary inner diameter 1024, at most 15% of the sampling capillary inner diameter 1024, 10-25% of the sampling capillary inner diameter 1024, 20-35% of the sampling capillary inner diameter 1024, and/or 25-45% of the sampling capillary inner diameter 1024.

By directing the laser beam 1024 to a targeted region 1004 in a region of substantial gas flow, the ablated material 1008 may be effectively separated from the sample 1002 and drawn into the sampling capillary 1120 by the Coanda effect. By contrast, positioning the sampling capillary 1120 such that the sampling capillary central axis 1122 is collinear with the beam axis 1026 can result in generation of an ablation plume in a region of relative stagnation or eddying of the third gas flow 1134, which can diminish and/or impede a flow of the ablated material 1008 into the sampling capillary 1120.

In general, a flow rate of each gas flow into the sample transfer assembly 1100 may be at least partially based on a flow rate of one or more of the other gas flows into the sample transfer assembly 1100. Accordingly, control of the flow dynamics of the ablated material 1008 and/or of the ionized sample particles 1166 within the sample transfer assembly 1100 and/or of an efficiency with which the ablated material 1008 is delivered to the ion analyzer 1400 may require active and/or iterative adjustment of the first flow rate, the second flow rate, and/or the third flow rate as described herein.

In this manner, the values of the first flow rate, the second flow rate, and/or the third flow rate can be balanced (e.g., independently adjusted) relative to one another to enhance efficient transfer of the ablated material 1008 to the analyzer inlet 1402. Additionally or alternatively, these flow rates can be balanced and/or adjusted to account for additional gas flows in the sample transfer assembly 1100, such as gas flows associated with the ionizing unit 1040, gas flows associated with additional inlets, gas flows near the analyzer inlet 1402 (e.g., a curtain gas flow and/or a sheath gas flow), etc.

Accordingly, in some examples, an operational configuration of the sample probe system 1000 may be at least partially characterized in terms of relative flow rates of the gas flows therein, which in turn may be related to a characteristic size of particles that are most efficiently transported in such configurations. As an example, operating the sample probe system 1000 such that a mixture ratio of the second flow rate to the third flow rate is approximately 11:1 may facilitate efficient transport of ablated material 1008 in the form of particles smaller than about 100 nm in size. Alternatively, operating the sample probe system 1000 at lower mixture ratios may facilitate efficient transport of ablated material 1008 in the form of particles in the range of about 1-10 nm in size.

In various examples, control of the flow dynamics of the ablated material 1008 through the sample transfer assembly 1100 can facilitate organizing a concentric flow of the ablated material 1008 through and/or out of the sample transfer assembly 1100. Such a concentric flow can be achieved and/or enhanced, for example, by configuring internal dimensions of the sample transfer assembly 1100 and/or flow rates through the sample transfer assembly 1100 to promote laminar flow of the ablated material 1008. In particular, mixing the ablated material 1008 with the ionizing material 1046 in a laminar flow can avoid mixing via diffusion and/or turbulence, which otherwise may result in uncontrollable losses of the ablated material 1008, e.g., due to collisions with the walls and significant amounts of flow being trapped in vortices in the analyzer adapter unit 1170. Such turbulent mixing also can undesirably lead to peak tailing in a signal generated by the ion analyzer 1400. Moreover, relative gas flow rates through the sample transfer assembly 1100 can be adjusted to increase or decrease concentration of ablated material 1008 towards a center of the sample transfer pipe 1160 and away from the walls. By concentrating the ablated material 1008 towards a center of the sample transfer pipe 1160, losses of ablated material 1008 at the transition between the sample transfer pipe 1160 and the analyzer inlet 1402 are reduced. In particular, the second gas flow 1302 can form a sheath around a core flow of the ablated material 1008 within the sample transfer pipe 1160, thereby restricting the ablated material 1008 from colliding with the walls of the sample transfer pipe 1160 and directing the ablated material 1008 toward the analyzer inlet 1402.

Such a concentric flow out of the sample transfer assembly 1100 also can facilitate directing the sample material flow 1018 directly into the analyzer inlet 1402 in a manner that reduces losses of the ablated material 1008. In some examples, the analyzer inlet 1402 can be shaped and/or otherwise configured to accept the flow of ablated material 1008 from a variety of directions. For example, and as shown in FIG. 1A, the analyzer inlet 1402 can have a flared and/or trumpeted shape to direct the ablated material 1008 to the ion analyzer 1400 even when the flow of ablated material 1008 is not perfectly concentric with the analyzer inlet 1402.

When present, the capillary positioning stage 1016 can include and/or be any suitable mechanism, such as a movement stage (e.g., a translation stage and/or a rotation stage). In some examples, the sampling capillary 1120 and/or at least a portion of the sample transfer assembly 1100 is supported by the capillary positioning stage 1016 relative to the sample 1002.

In some examples, a position of the sampling capillary 1120 and/or of the sample transfer assembly 1100 relative to the sample 1002 and/or the sample stage 1010 additionally or alternatively may be controlled by moving the sample 1002 and/or the sample stage 1010 relative to the sample transfer assembly 1100. For example, the sample stage 1010 may be supported by, and/or may include, a movement (e.g., translation and/or rotation) stage configured to selectively position the sample 1002 relative to the sample transfer assembly 1100 and/or the sampling capillary 1120. In some examples, the sample stage 1010 and/or an associated movement stage can be used to move the sample 1002 relative to the laser beam 1024 to scan (e.g., raster scan) the laser beam 1024 across a region of the sample 1002.

When present, each of the first gas flow 1202, the second gas flow 1302, and the third gas flow 1134 can include and/or be any of a variety of gases. In some examples, such as when the sample 1002 includes a biological and/or organic sample, it may be desirable to use a bioinert, biocompatible, and/or oxygen-free gas, such as nitrogen gas and/or a noble gas, as the first gas flow 1202, the second gas flow 1302, and/or the third gas flow 1134.

The sampling capillary 1120 may be configured to convey the ablated material 1008 to the sample transfer pipe 1160 in any of a variety of manners. In the example of FIG. 1A, and as described in more detail below, the sampling capillary 1120 conveys the ablated material 1008 to the sample transfer pipe 1160 via various intermediate components. In other examples, the sampling capillary 1120 can be configured to convey the ablated material 1008 directly to the sample transfer pipe 1160.

In various examples, the sample transfer assembly 1100 can be described as including a sample transfer conduit 1150 that includes the sample transfer pipe 1160 as well as a sampling conduit 1110 that includes the sampling capillary 1120. In such examples, the sampling capillary 1120 may be described as conveying the ablated material 1008 to the sample transfer conduit 1150 and/or to the sample transfer pipe 1160. Similarly, in such examples, the sample transfer conduit 1150 may be described as receiving the ablated material 1008 from the sampling conduit 1110 and/or from the sampling capillary 1120. In various examples, and as shown in FIG. 1A, the sampling conduit 1110 can be directly coupled to the sample transfer conduit 1150.

As shown in FIG. 1A, the sample transfer conduit 1150 can include a sample transfer conduit first inlet 1152, a sample transfer conduit second inlet 1154, and a sample transfer conduit outlet 1130. In this example, each of the sample transfer conduit first inlet 1152 and the sample transfer conduit second inlet 1154 may be described as representing an inlet and/or entrance to the sample transfer pipe 1160. The sample transfer conduit outlet 1130 can be configured to expel the ablated material 1008 (e.g., in the form of the ionized sample particles 1166) to the analyzer inlet 1402.

The sample transfer conduit first inlet 1152 can be configured to receive the ionizing material 1046 and/or the second gas flow 1302, while the sample transfer conduit second inlet 1154 can be configured to receive the ablated material 1008, such as from the sampling conduit 1110 and/or the sampling capillary 1120. In particular, in the example of FIG. 1A, the sampling conduit 1110 is directly coupled to the sample transfer conduit second inlet 1154 and is angled relative to the sample transfer conduit 1150 by the capillary intersection angle 1156. More specifically, in this example, the sampling conduit 1110 includes a sampling conduit outlet 1112 that is coupled to the sample transfer conduit 1150 at the sample transfer conduit second inlet 1154 at the capillary intersection angle 1156. In other examples, the sampling capillary 1120 may be coupled (e.g., directly coupled) to the sample transfer conduit second inlet 1154.

In the example of FIG. 1A, the sample transfer assembly 1100 additionally includes a capillary junction unit 1140 that fluidly couples the sampling capillary 1120 and the sample transfer pipe 1160 to one another. Stated differently, the sampling capillary 1120 and the sample transfer pipe 1160 are fluidly coupled to one another via the capillary junction unit 1140. In this example, the capillary junction unit 1140 includes and/or defines a portion of the sampling conduit 1110 and of the sample transfer conduit 1150. In particular, the capillary junction unit 1140 includes a portion of the sampling conduit 1110 that extends between the sampling capillary 1120 and the sample transfer conduit 1150 as well as a portion of the sample transfer conduit 1150 that extends between the sample conduit 1110 and the sample transfer pipe 1160. The capillary junction unit 1140 additionally defines the sample transfer conduit first inlet 1152 and the sample transfer conduit second inlet 1154.

The capillary junction unit 1140 can be coupled to the sampling capillary 1120 in any suitable manner. For example, the capillary junction unit 1140 can include a sampling capillary interface 1144 that couples the sampling capillary 1120 to the capillary junction unit 1140. In some such examples, the sampling capillary interface 1144 receives a portion of the sampling capillary 1120, such as by inserting the sampling capillary 1120 into the capillary junction unit 1140 at the sampling capillary interface 1144.

Additionally or alternatively, the sampling capillary 1120 can be removably coupled to the sampling capillary interface 1144. In particular, in some examples, the sample probe system 1000 may be configured such that the sampling capillary 1120 can be selected from among a plurality of sampling capillaries 1120 of varying dimensions (e.g., of varying sampling capillary inner diameters 1124), such as based upon properties of the sample 1002 under investigation, and selectively coupled to the capillary junction unit 1140 for analysis of the sample 1002. In such examples, the sampling capillary 1120 may be coupled to the sampling capillary interface 1144 via any of a variety of releasable couplings, examples of which include a threaded coupling, a pin-lock coupling, a bayonet-lock coupling, a ferrule-lock coupling, etc. In some examples, each of the plurality of sampling capillaries 1120 can be characterized by the same or similar sampling capillary outer diameter 1126, which in turn may represent a diameter that is configured to operatively engage the sampling capillary interface 1144. In this manner, any of the plurality of sampling capillaries 1120 can be operatively coupled to the sampling capillary interface 1144 in a similar manner regardless of the respective internal dimensions thereof.

Similarly, the capillary junction unit 1140 can be coupled to the sample transfer pipe 1160 in any suitable manner. For example, the capillary junction unit 1140 can include an upstream sample transfer pipe interface 1146 that couples the sample transfer pipe 1160 to the capillary junction unit 1140. In some such examples, upstream sample transfer pipe interface 1146 receives a portion of the sample transfer pipe 1160, such as by inserting the sample transfer pipe 1160 into the capillary junction unit 1140 at upstream sample transfer pipe interface 1146.

Additionally or alternatively, the sample transfer pipe 1160 can be removably coupled to upstream sample transfer pipe interface 1146. In such examples, the sample transfer pipe 1160 may be coupled to upstream sample transfer pipe interface 1146 via any of a variety of releasable couplings, examples of which include a threaded coupling, a pin-lock coupling, a bayonet-lock coupling, a ferrule-lock coupling, etc.

In some examples, and as shown in FIG. 1A, the sample transfer pipe 1160 is coupled to the upstream sample transfer pipe interface 1146 via an upstream sample transfer pipe adapter 1148. For example, the upstream sample transfer pipe adapter 1148 can be removably coupled to the sample transfer pipe 1160 and/or to upstream sample transfer pipe interface 1146, such as via a threaded coupling, a pin-lock coupling, a bayonet-lock coupling, a ferrule-lock coupling, etc. In other examples, the upstream sample transfer pipe adapter 1148 can be fixedly coupled to the capillary junction unit 1140.

In the example of FIG. 1A, the capillary junction unit 1140 includes the second gas inlet 1300 such that the second gas flow 1302 flows into the sample transfer conduit 1150 and the sample transfer pipe 1160 via the capillary junction unit 1140. In such examples, the second gas inlet 1300 additionally or alternatively may be described as a capillary junction gas inlet 1300, and/or the second gas flow 1302 additionally or alternatively may be described as a capillary junction unit gas flow 1302. Similarly, the second regulator mechanism 1304 additionally or alternatively may be described as an upstream inlet regulator mechanism 1304.

In the example of FIG. 1A, the capillary junction unit 1140 includes the second gas inlet 1300 in the form of an inlet extending through a structure that at least partially encloses one or more conduits that fluidly couple the sampling capillary 1120 and the sample transfer pipe 1160 to one another. This is not required of all examples, however, and it additionally is within the scope of the present disclosure that the second gas inlet 1300 can be a portion of a conduit that is coupled to and/or coextensive with the sample transfer pipe 1160. For example, the sample transfer conduit first inlet 1152 can represent and/or form the second gas inlet 1300 of sample probe system 1000.

In the example of FIG. 1A, the capillary junction unit 1140 additionally includes and/or supports at least a portion of the ionizing unit 1040, such as the electrospray needle 1042 or the corona discharge needle 1044. In particular, in this example, the capillary junction unit 1140 defines an inner chamber 1142 such that the ionizing unit 1040 is at least partially received within the inner chamber 1142.

Additionally, in the example of FIG. 1A, the capillary positioning stage 1016 is directly coupled to and/or supports the capillary junction unit 1140. In this manner, the capillary positioning stage 1016 can operate to control a position of the sampling capillary inlet 1128 relative to the sample 1002 by moving the capillary junction unit 1140 relative to the sample 1002. In other examples, the capillary positioning stage 1016 may be directly coupled to and/or may support the sampling capillary 1120.

While FIG. 1A illustrates an example in which the sampling capillary 1120 and the sample transfer pipe 1160 are coupled to one another via the capillary junction unit 1140, this is not required of all examples. For example, it additionally is within the scope of the present disclosure that the sampling capillary 1120 and/or the sampling conduit 1110 can be directly coupled to the sample transfer pipe 1160. In such examples, the sample transfer pipe 1160 may be described as including the sample transfer conduit first inlet 1152 and/or the sample transfer conduit second inlet 1154.

In the example of FIG. 1A, the sample transfer assembly 1100 additionally includes an analyzer adapter unit 1170 configured such that the sample material flow 1018 (e.g., the ablated material 1008 and/or the ionized sample particles 1166) is conveyed from the sample transfer conduit 1150 and/or the sample transfer pipe 1160 to the analyzer inlet 1402 via the analyzer adapter unit 1170. In the example of FIG. 1A, the analyzer adapter unit 1170 includes and/or defines the first gas inlet 1200. Accordingly, the analyzer adapter unit 1170 can at least partially direct the first gas flow 1202 to flow into the analyzer inlet 1402, such as by restricting the first gas flow 1202 from flowing away from the analyzer inlet 1402.

The sample transfer pipe 1160 can be coupled to the analyzer adapter unit 1170 in any of a variety of manners. For example, the sample transfer pipe 1160 can be directly coupled to the analyzer adapter unit 1170. Additionally or alternatively, the analyzer adapter unit 1170 can include a downstream sample transfer pipe interface 1172 that couples the sample transfer pipe 1160 to the analyzer adapter unit 1170. In some such examples, the downstream sample transfer pipe interface 1172 receives a portion of the sample transfer pipe 1160, such as by inserting the sample transfer pipe 1160 into the analyzer adapter unit 1170 at the downstream sample transfer pipe interface 1172.

Additionally or alternatively, the sample transfer pipe 1160 can be removably coupled to the downstream sample transfer pipe interface 1172. In such examples, the sample transfer pipe 1160 may be coupled to the downstream sample transfer pipe interface 1172 via any of a variety of releasable couplings, examples of which include a threaded coupling, a pin-lock coupling, a bayonet-lock coupling, a ferrule-lock coupling, etc.

In some examples, and as shown in FIG. 1A, the sample transfer pipe 1160 is coupled to the downstream sample transfer pipe interface 1172 via a downstream sample transfer pipe adapter 1174. For example, the downstream sample transfer pipe adapter 1174 can be removably coupled to the sample transfer pipe 1160 and/or to the downstream sample transfer pipe interface 1172, such as via a threaded coupling, a pin-lock coupling, a bayonet-lock coupling, a ferrule-lock coupling, etc. In other examples, the downstream sample transfer pipe adapter 1174 can be fixedly coupled to the analyzer adapter unit 1170.

In the example of FIG. 1A, the analyzer adapter unit 1170 includes an analyzer transfer capillary 1180 configured to receive the sample material flow 1018 from the sample transfer pipe 1160 and to convey the sample material flow 1018 to the analyzer inlet 1402. In such examples, the sample transfer conduit 1150 may be described as including the analyzer transfer capillary 1180. Specifically, in some examples, the analyzer transfer capillary 1180 may be described as representing a portion of the sample transfer conduit 1150 that extends within the analyzer adapter unit 1170. Additionally or alternatively, the analyzer transfer capillary 1180 may be described as defining a sample transfer conduit outlet 1158 of the sample transfer conduit 1150. In some examples, the analyzer transfer capillary 1180 is fixedly coupled to at least a portion of the analyzer adapter unit 1170, such as to the downstream sample transfer pipe interface 1172 and/or to the downstream sample transfer pipe adapter 1174.

In some examples, the analyzer adapter unit 1170 can be configured to permit motion and/or repositioning of the analyzer transfer capillary 1180 relative to the analyzer inlet 1402. For example, the analyzer adapter unit 1170 can include a body portion 1176 that is fixed relative to the analyzer inlet 1402, and the downstream sample transfer pipe interface 1172 and/or the analyzer transfer capillary 1180 can be movably coupled to the body portion 1176.

In particular, in the example of FIG. 1A, the analyzer adapter unit 1170 includes a coupling member 1178 via which the downstream sample transfer pipe interface 1172 is coupled to the body portion 1176. The coupling member 1178 can be configured to permit translation of the sample transfer pipe interface 1172 (and thus of at least a portion of the sample transfer conduit 1150) relative to the body portion 1176 in one or more directions. In this manner, the coupling member 1178 may permit adjustment of a position of the sampling conduit 1110, of the sample transfer conduit 1150, and/or of a component thereof relative to the sample 1002 while the body portion 1176 and the analyzer inlet 1402 remain fixed relative to the sample 1002. When present, the coupling member 1178 can include and/or be any suitable component and/or material, examples of which include a membrane, a gasket, a flexible seal, etc. In some examples, the coupling member 1178 desirably provides a thermal barrier between the heated analyzer transfer capillary 1180 and the relatively cool body portion 1176 of the analyzer adapter unit 1170.

While FIG. 1A illustrates an example in which the sample material flow 1018 is transferred to the analyzer inlet 1402 via the analyzer adapter unit 1170, this is not required of all examples. For example, it additionally is within the scope of the present disclosure that the sample transfer pipe 1160 can directly face the analyzer inlet 1402. In such examples, the sample transfer pipe 1160 may be described as including the sample transfer conduit outlet 1158.

In some examples, and as shown in FIG. 1A, the sample probe system 1000 additionally includes a controller 1500 programmed and/or configured to control one or more components of the sample probe system 1000. For example, the controller 1500 can be programmed and/or configured to control generation of the laser beam 1024 by the laser source 1022 and/or to receive an image of a portion of the sample 1002 from the sample imaging device 1032.

Additionally or alternatively, the controller 1500 may be operable to control, directly or indirectly, one or more properties of a flow of gases and/or of the ablated material 1008 through the sample transfer assembly 1100. For example, the controller 1500 may be programmed and/or configured to control the first regulator mechanism 1204 to regulate the first flow rate of the first gas flow 1202 and/or to control the second regulator mechanism 1304 to regulate the second flow rate of the second gas flow 1302. Similarly, the controller 1500 may be programmed and/or configured to control the capillary positioning stage 1016 to regulate the third flow rate of the third gas flow 1134 into the sampling capillary 1120, such as by varying the sample separation distance 1132 and/or a separation between the beam axis 1026 and the sampling capillary central axis 1122.

The controller 1500 also may be in communication with the ion analyzer 1400, such as to receive an indication of a signal strength corresponding to the amount of ablated material 1008 received by the analyzer inlet 1402. Such a signal strength may in turn correspond to and/or represent a transport efficiency with which the sample probe system 1000 conveys the ablated material 1008 from the sample 1002 to the analyzer inlet 1402.

The controller 1500 may be programmed and/or configured to communicate with any other components of the sample probe system 1000 in any suitable manner, such as via wired and/or wireless connections.

As discussed above, the transport efficiency of the sample probe system 1000 can depend, at least in part, on various selectively variable flow characteristics within the sample transfer assembly 1100 and/or flow rates of gases into the sample transfer assembly 1100. The controller 1500 thus can enable actively and/or automatically enhancing the transport efficiency of the sample probe system 1000. For example, the controller 1500 can be programmed and/or configured to represent to a user a transport efficiency corresponding to a particular configuration of the sample probe system 1000, and the user can selectively adjust the configuration of the sample probe system 1000 to vary and/or enhance the transport efficiency. In particular, the user can adjust the configuration of the sample probe system 1000 by varying the first flow rate, the second flow rate, and/or the third flow rate in any manner described herein, such as via the controller 1500.

Additionally or alternatively, the controller 1500 may be programmed and/or configured to adjust a configuration of the sample probe system 1000 automatically to vary and/or enhance the transport efficiency of the ablated material 1008 through the sample transfer assembly 1100. For example, the controller 1500 can receive an indication of the transport efficiency from the ion analyzer 1400, and can automatically adjust the first flow rate, the second flow rate, and/or the third flow rate in any manner described herein to enhance the transport efficiency.

Figure 2:
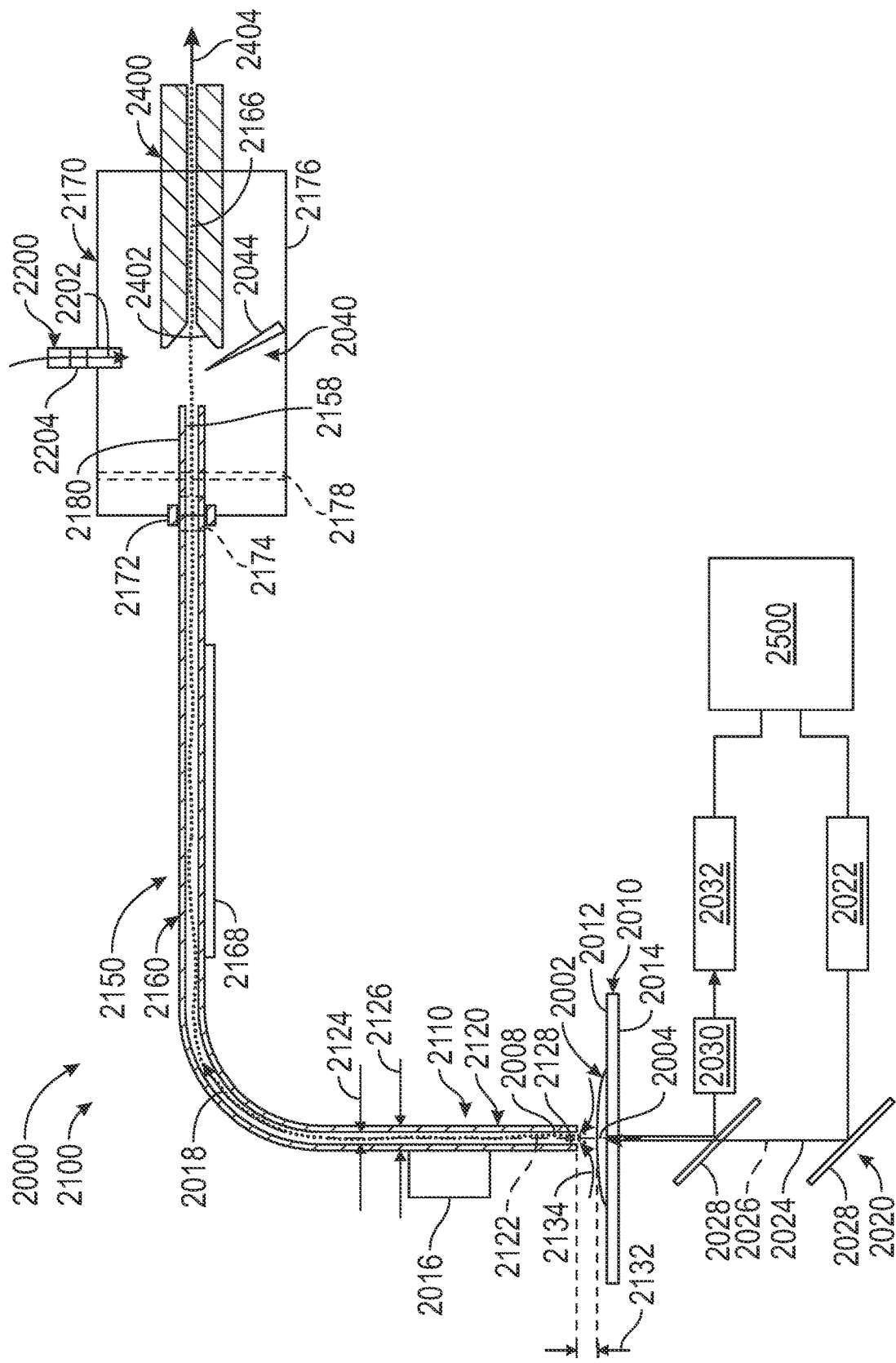
FIG. 2 is a schematic illustration of a sample probe system according to another example.

FIG. 2 illustrates another example of a sample probe system 2000. The sample probe system 2000 of FIG. 2 is substantially similar to the sample probe system 1000 of FIG. 1A except as described herein. Accordingly, like reference numerals are used to label like components in FIGS. 1A-2. Specifically, except as discussed below, all illustrated components of the sample probe system 2000, labeled or unlabeled, can share any suitable features, characteristics, attributes, etc. with the corresponding components of the sample probe system 1000. For those components labeled in FIG. 2, components labeled with a reference numeral of the form "2XXX" are intended to correspond with the components labeled with a reference numeral of the form "1XXX" in FIG. 1A. For example, the optical assembly 2020 of FIG. 2 corresponds to, and may be at least substantially identical to, the optical assembly 1020 of FIG. 1A.

In contrast with the sample probe system 1000 of FIG. 1A, the sample probe system 2000 lacks a separate sampling conduit, a separate sampling capillary, or a capillary junction unit. By contrast, in the example of FIG. 2, the sample probe system 2000 includes a sample transfer assembly 2100 with a sample transfer conduit 2150 that receives the ablated material 2008 directly from the sample 2002. The sample transfer conduit 2150 may be characterized by a sample transfer conduit inner diameter 2124 and/or a sample transfer conduit outer diameter 2126, which can assume values similar to those disclosed herein with reference to the sampling capillary 1120 and/or the sample transfer pipe 1160 of FIG. 1A.

In the example of FIG. 2, the sample transfer conduit 2150 includes a sample transfer conduit inlet 2128 and extends away from the sample transfer conduit inlet 2128 along a sample transfer conduit central axis 2122. The sample transfer conduit inlet 2128 and the sample transfer conduit central axis 2122 may be described as corresponding to the sampling capillary inlet 1128 and the sampling capillary central axis 1122 of FIG. 1A, respectively.

Various portions of the sample transfer conduit 2150 of FIG. 2 may be described and/or named in analogy to corresponding components of the sample transfer assembly 1100 of FIG. 1A. For example, and as shown in FIG. 2, a portion of the sample transfer conduit 2150 proximate to the sample transfer conduit inlet 2128 may be described as a sampling conduit 2110 and/or as a sampling capillary 2120. Similarly, a portion of the sample transfer conduit 2150 downstream of the sampling conduit 2110 may be described as a sample transfer conduit 2150 and/or as a sample transfer pipe 1260. Additionally or alternatively, the sample transfer conduit inlet 2128 of FIG. 2 may be described as being analogous to the sampling capillary inlet 1128 of FIGS. 1A-1B, and/or can be described as representing a gas inlet of the sample transfer assembly 2100.

In the example of FIG. 2, the sample transfer conduit 2150 is curved between the sample 2002 and the analyzer inlet 2402. This is not required of all examples, however, and it additionally is within the scope of the present disclosure that the sample transfer conduit 215 may be at least substantially straight between the sample 2002 and the analyzer inlet 2402.

Additionally, in the example of FIG. 2, the ionizing unit 2040 is at least partially received within the analyzer adapter unit 2170. In particular, in this example, the ionizing unit 2040 includes a corona discharge needle 2044 that is positioned at least partially within the analyzer adapter unit 2170. The ionizing unit 2040 thus operates to ionize the ablated material 2008 via APCI as the ablated material 2008 exits the sample transfer conduit 2150 within the analyzer adapter unit 2170. Other ionization means could be used, such as electrospray, dielectric barrier discharge, etc. as known in the art. It is to be understood that the examples of FIGS. 1A and 2 are non-limiting, and that any suitable form of the ionizing unit 1040/2040 can be used in the configurations of FIGS. 1A and 2. For example, it also is within the scope of the present disclosure that the ionizing unit 1040 of FIG. 1A additionally or alternatively can be at least partially received within the analyzer adapter unit 1170 in the manner shown in FIG. 2. Additionally, it is to be understood that each of the ionizing unit 1040 and the ionizing unit 2040 can include and/or be any suitable ionizing means disclosed herein and/or known in the art.

In contrast with the sample probe system 1000 of FIG. 1A, the sample probe system 2000 also lacks a capillary junction gas inlet that introduces a gas flow into the sample transfer assembly 2100 between the sample transfer conduit inlet 2128 and the sample transfer conduit outlet 2158. Similar to the sample probe system 1000 of FIG. 1A, however, various properties of the flow of the ablated material 1008 through the sample transfer conduit 2150 may be controlled through regulation of the first flow rate of the first gas flow 2202 through the first gas inlet 2204, as described above with reference to the first gas flow 1202. Similarly, various properties of the flow of the ablated material 1008 through the sample transfer conduit 2150 may be controlled through regulation of a sample flow rate of a sample gas flow 2134 into the sample transfer conduit inlet 2128, as described above with reference to the third gas flow 1134.

Figure 3A:
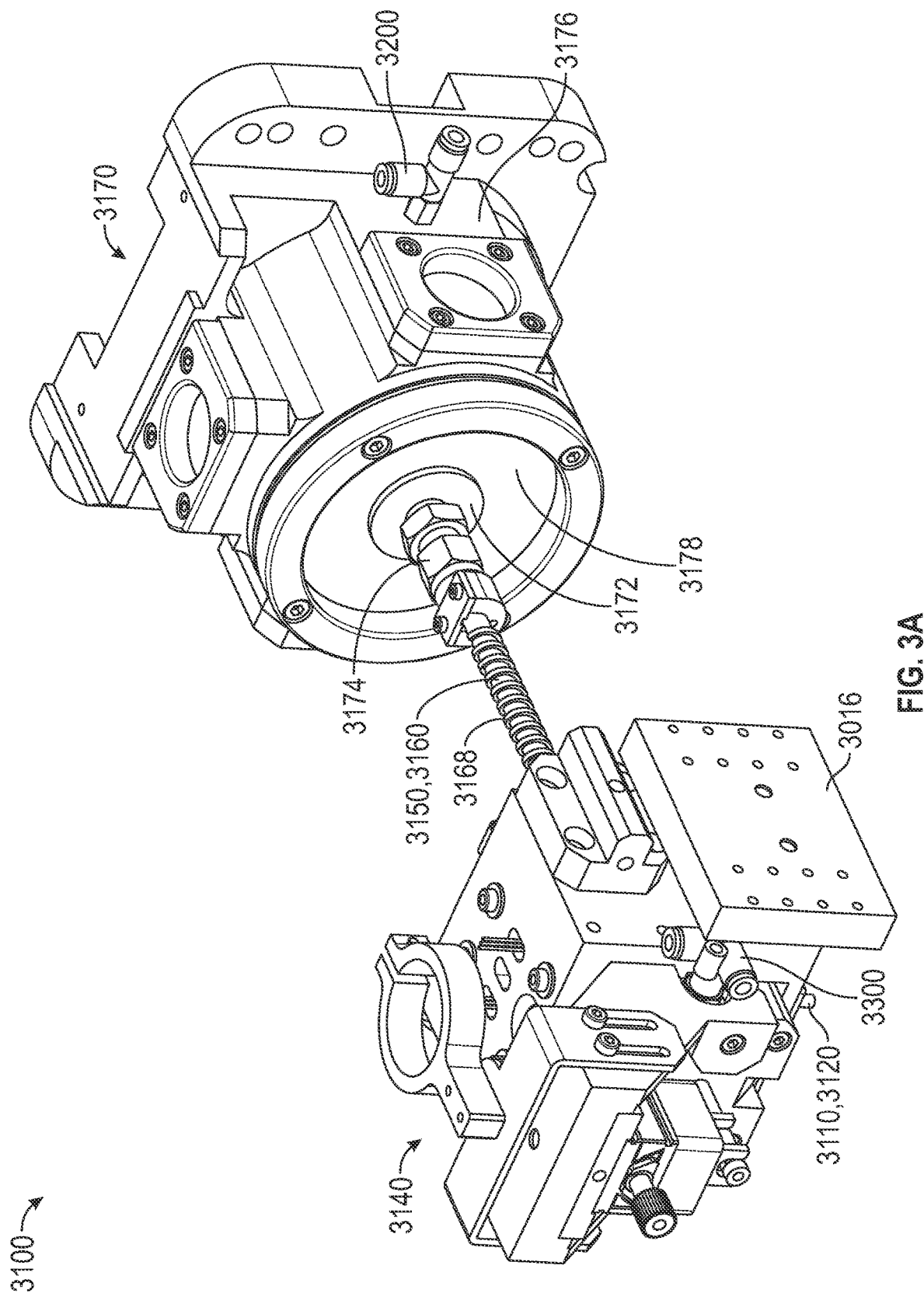
FIG. 3A is a top left side isometric view of a portion of a probe system according to yet another example.
Figure 3B:
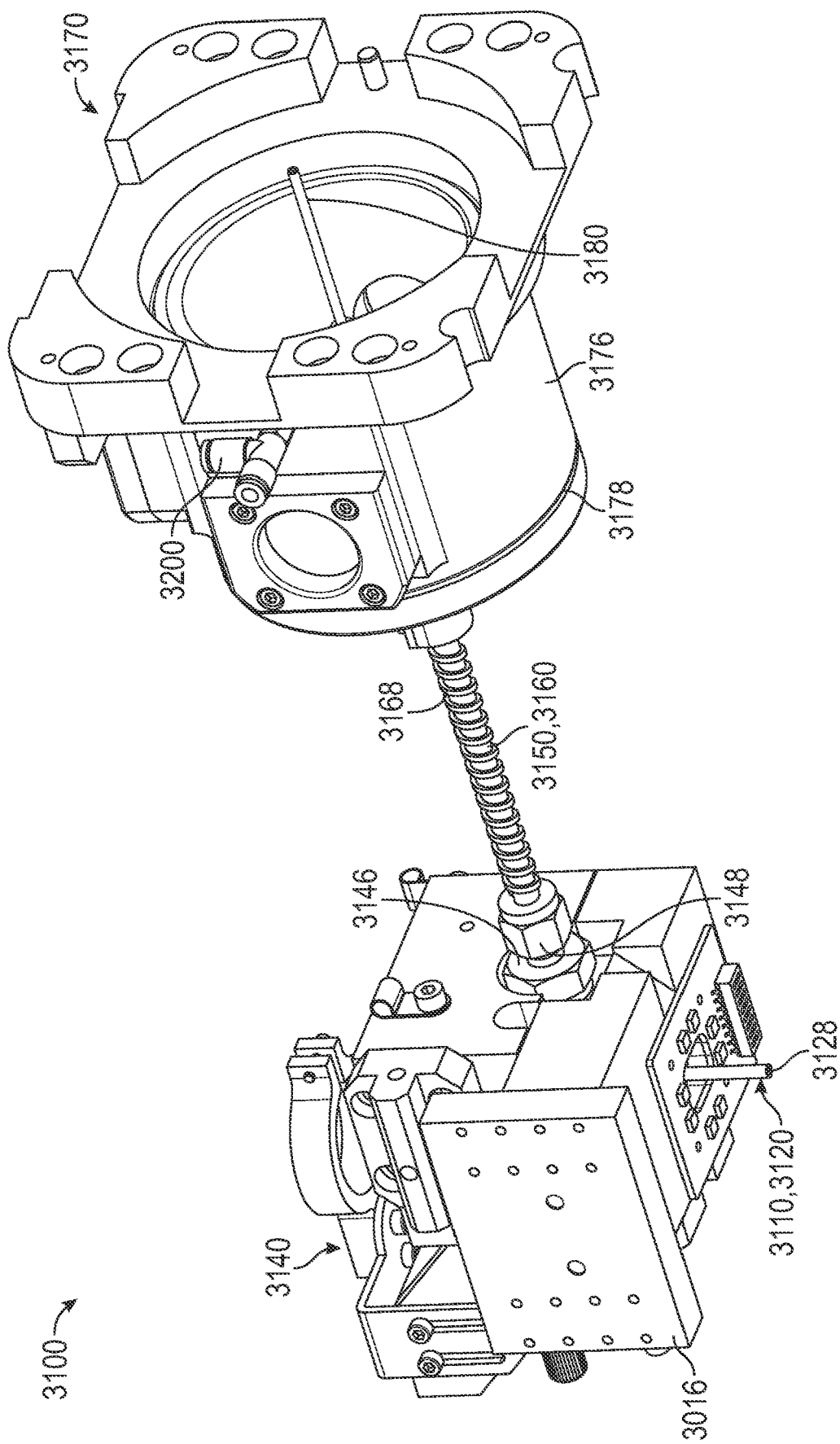
FIG. 3B is a bottom right side isometric view of the probe system of FIG. 3A.
Figure 3C:
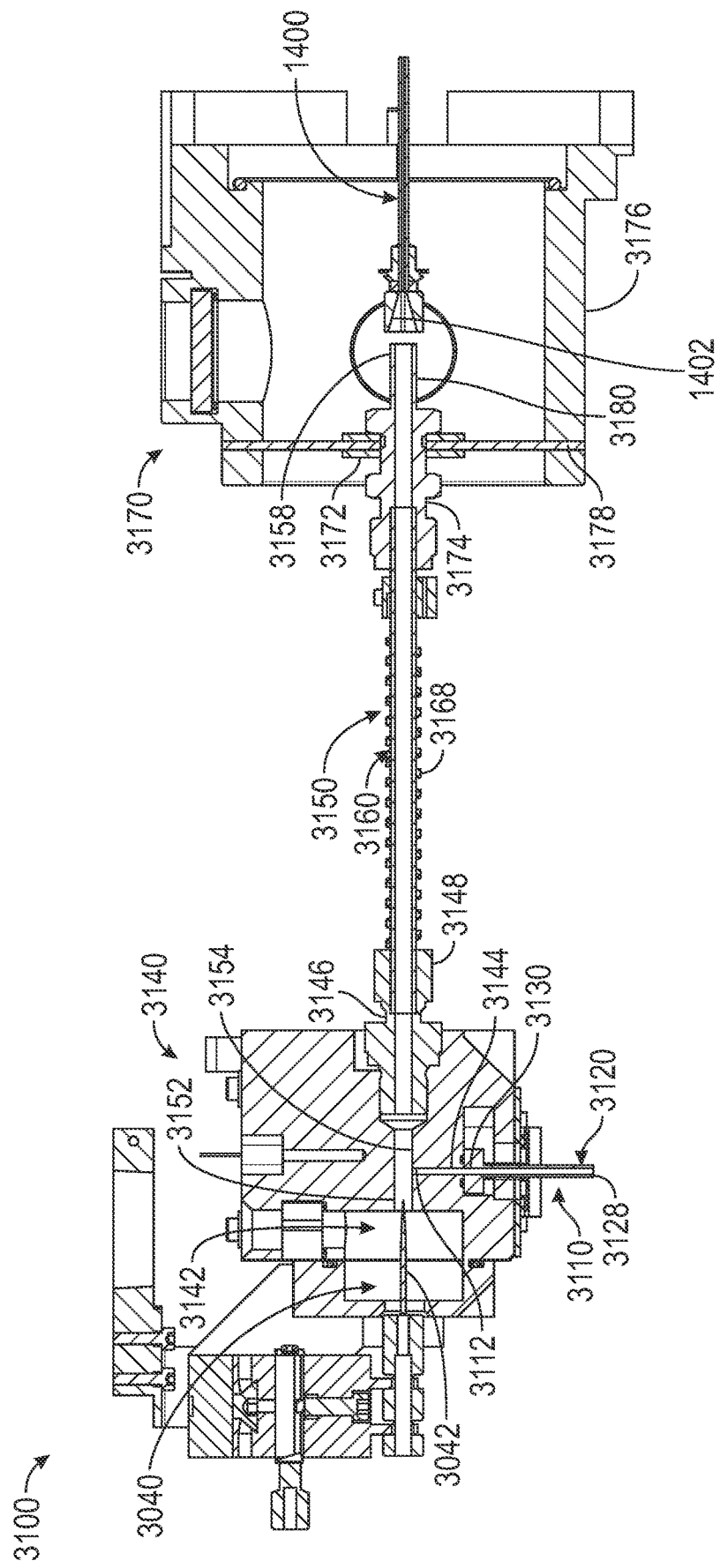
FIG. 3C is a cross-sectional side elevation view of the probe system of FIGS. 3A-3B.

FIGS. 3A-3C illustrate aspects of a sample transfer assembly 3100, which may be described as representing an example of the sample transfer assembly 1100 of FIG. 1A. Accordingly, like reference numerals are used to label like components in FIGS. 1A-1B and 3A-3C. Specifically, except as discussed below, all illustrated components of the sample transfer assembly 3100, labeled or unlabeled, can share any suitable features, characteristics, attributes, etc. with the corresponding components of the sample transfer assembly 1100. For those components labeled in FIGS. 3A-3C, components labeled with a reference numeral of the form "3XXX" are intended to correspond with the components labeled with a reference numeral of the form "1XXX" in FIG. 1A. For example, the analyzer adapter unit 3170 of FIGS. 3A-3C corresponds to the analyzer adapter unit 1170 of FIG. 1A.

In the example of FIGS. 3A-3C, the sample transfer pipe 3160 is coupled to the upstream sample transfer pipe interface 3146 via the upstream sample transfer pipe adapter 3148, which permits the sample transfer pipe 3160 to be removed from the capillary junction unit 3140. Similarly, in this example, the sample transfer pipe 3160 is coupled to the downstream sample transfer pipe interface 3172 via the downstream sample transfer pipe adapter 3174, which permits the sample transfer pipe 3160 to be removed from the analyzer adapter unit 3170. The sampling capillary 1120 is removably attached to the capillary junction unit 3140 at the sampling capillary interface 3144. The ionizing unit 3040 includes an electrospray needle 3042 that extends within the inner chamber 3142 of the capillary junction unit 3140. Additional aspects of the sample transfer assembly 3100 of FIGS. 3A-3C may be understood with reference to the foregoing discussions of corresponding components of the sample transfer assembly 1100 of FIG. 1A.

Figure 4:
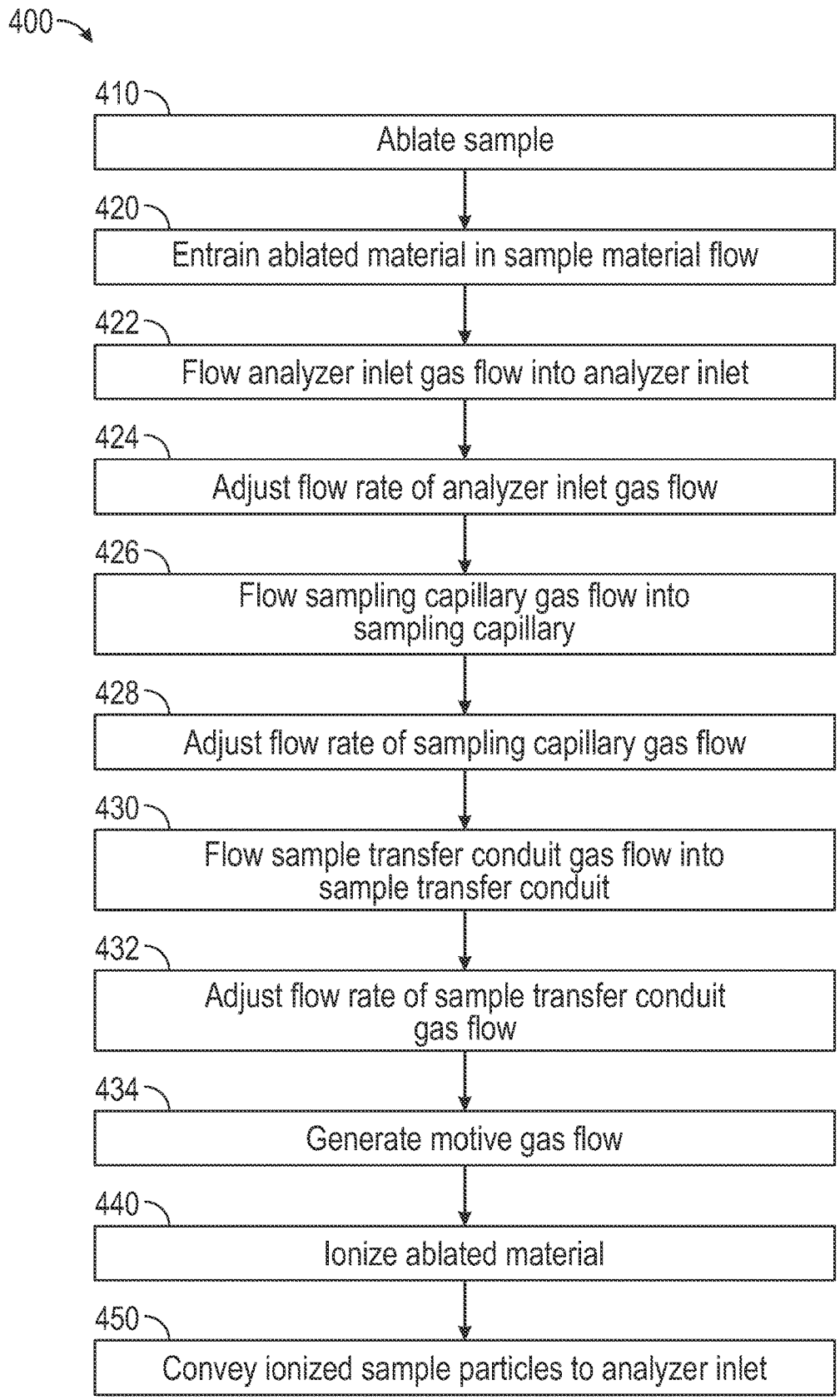
FIG. 4 is a flow chart depicting methods of ionizing a sample for analysis by an ion analyzer according to an example.

FIG. 4 is a flow chart depicting examples of a method 400 of transferring ablated and ionized sample material (e.g., the ablated material 1008 and/or the ionized sample particles 1166 of FIG. 1A) to an analyzer inlet of an ion analyzer (e.g., the analyzer inlet 1402 of the ion analyzer 1400 of FIG. 1A). In the following discussion, various components are described in the context of the method 400 with terms that correspond to components illustrated in FIG. 1A and discussed above. Such components described herein with reference to the method 400 thus may be understood as corresponding to and/or representing the similarly named components described above with reference to FIG. 1A. Such components also may correspond to components illustrated in FIGS. 2 and/or 3A-3C as described above.

As shown in FIG. 4, the method 400 includes ablating, at 410, a sample to produce ablated material and entraining, at 420, the ablated material in a sample material flow. The sample material flow includes the ablated material and flows within a sample transfer assembly. The method 400 additionally includes ionizing, at 440, the ablated material to produce ionized sample particles and conveying, at 450, the ionized sample particles to an analyzer inlet of an ion analyzer. As described herein, the entraining the ablated material in the sample material flow at 420 includes flowing, at 422, a downstream inlet gas flow (e.g., the first gas flow

1202 of FIG. 1A) into the analyzer inlet to at least partially induce the sample material flow.

In some examples, the entraining the ablated material in the sample material flow at 420 includes receiving the ablated material into a sampling conduit of the sample transfer assembly, and the ionizing the ablated material at 440 is performed within a sample transfer conduit of the sample transfer assembly. In some such examples, the entraining the ablated material in the sample material flow at 420 is performed such that the sample material flow is at least substantially laminar within the sampling conduit and/or the sample transfer conduit.

The ablating the sample at 410 can be performed in any suitable manner. For example, the ablating the sample at 410 can include ablating and/or aerosolizing the sample with a laser source, such as a laser source that directs a laser beam to an opposite side of the sample than that at which the ablated material flows into the sample transfer assembly. In some examples, the ablating the sample at 410 includes ablating with femtosecond laser pulses generated by the laser source and directed to the sample.

The entraining the ablated material in the sample material flow at 420 can be performed in any suitable manner. For example, the entraining the ablated material in the sample material flow at 420 can include flowing, at 426, a sampling capillary gas flow (e.g., the third gas flow 1134 of FIG. 1A) into a sampling capillary of the sampling conduit. In some such examples, the flowing the sampling capillary gas flow at 426 is performed passively. For example, the sampling capillary gas flow may be drawn into the sampling capillary by one or more gas flows initiated downstream of the sampling capillary.

In some examples, the method 400 can include adjusting, at 428, a flow rate of the sampling capillary gas flow. For example, the adjusting the flow rate of the sampling capillary gas flow at 428 can include adjusting a sample separation distance between the sampling capillary and the sample.

In some examples, the entraining the ablated material in the sample material flow at 420 additionally or alternatively includes flowing, at 430, a sample transfer conduit gas flow (e.g., the second gas flow 1302 of FIG. 1A) into a sample transfer conduit of the sample transfer assembly. In some such examples, the flowing the sample transfer conduit gas flow at 430 is performed passively. For example, the sample transfer conduit gas flow may be drawn into the sample transfer conduit by one or more gas flows initiated downstream of the sample transfer conduit.

In some examples, the method 400 can include adjusting, at 432, a flow rate of the sample transfer conduit gas flow. For example, the sample transfer assembly can include a sample transfer conduit upstream gas inlet (e.g., the second gas inlet 1300 of FIG. 1A) configured to receive the sample transfer conduit gas flow and an upstream inlet regulator mechanism (e.g., the second regulator mechanism 1304 of FIG. 1A) configured to selectively regulate a flow rate of the sample transfer conduit gas flow. Accordingly, the adjusting the flow rate of the sample transfer conduit gas flow at 432 can be performed, at least in part, with the upstream inlet regulator air mechanism. For example, the adjusting the flow rate of the sample transfer conduit gas flow at 432 can be performed, at least in part, by a controller that transmits a command to the upstream inlet regulator mechanism, such as responsive to a user input and/or based on an automated routine.

The flowing the downstream inlet gas flow at 422 can be performed in any suitable manner. In some examples, the flowing the downstream inlet gas flow at 422 can be performed passively. For example, the downstream inlet gas flow may be drawn into the analyzer inlet by one or more gas flows initiated downstream of the analyzer gas inlet. In particular, in some examples, the entraining the ablated material in the sample material flow at 420 includes generating, at 434, a motive gas flow downstream of the analyzer inlet. The motive gas flow may be at least partially generated by the ion analyzer.

The generating the motive gas flow at 434 can operate to induce a flow of the downstream inlet gas flow, the sample transfer conduit gas flow, and/or the sampling capillary gas flow. In this manner, actively generating the motive gas flow at 434 can result in passively generating at least a portion of the downstream inlet gas flow, the sample transfer conduit gas flow, and/or the sampling capillary gas flow.

In some examples, the method 400 can include adjusting, at 424, a flow rate of the downstream inlet gas flow. For example, the sample transfer assembly can include a sample transfer conduit downstream gas inlet (e.g., the first gas inlet 1200 of FIG. 1A) configured to receive the downstream inlet gas flow and a downstream inlet regulator mechanism (e.g., the first regulator mechanism 1204) configured to selectively regulate the flow rate of the downstream inlet gas flow. Accordingly, the adjusting the flow rate of the downstream inlet gas flow at 424 can be performed, at least in part, with the downstream inlet regulator mechanism. For example, the adjusting the flow rate of the downstream inlet gas flow at 424 can be performed, at least in part, by a controller that transmits a command to the downstream inlet regulator mechanism, such as responsive to a user input and/or based on an automated routine.

The ionizing the ablated material at 440 can be performed in any suitable manner. As an example, the ionizing the ablated material at 440 can include mixing the ablated material with an ionizing material, such as an ionizing material produced by an ionizing unit. As a more specific example, the ionizing material can include and/or be electrospray droplets produced by an electrospray needle. Additionally or alternatively, the ionizing material can be produced by an ionizing unit that includes and/or is an APCI source, a low-temperature plasma source, a glow discharge source, a dielectric barrier discharge source, a high-energy photon source, and/or a high-energy electron source.

In some examples, the sample transfer assembly includes a sample transfer conduit, and the ionizing the ablated material at 440 is performed within the sample transfer conduit (e.g., within a charge transfer region of the sample transfer conduit). In such examples, the method 400 additionally may include entraining a flow of the ionizing material within the sample transfer conduit to mix with the ablated material within the sample transfer conduit.

In some other examples, the ionizing the ablated material at 440 can be performed downstream of the sample transfer conduit. For example, the sample transfer assembly can include an analyzer adapter unit configured such that the ablated material is conveyed from the sample transfer conduit to the analyzer inlet via the analyzer adapter unit, and the ionizing the ablated material at 440 can be performed within the analyzer adapter unit.

Figure 5:
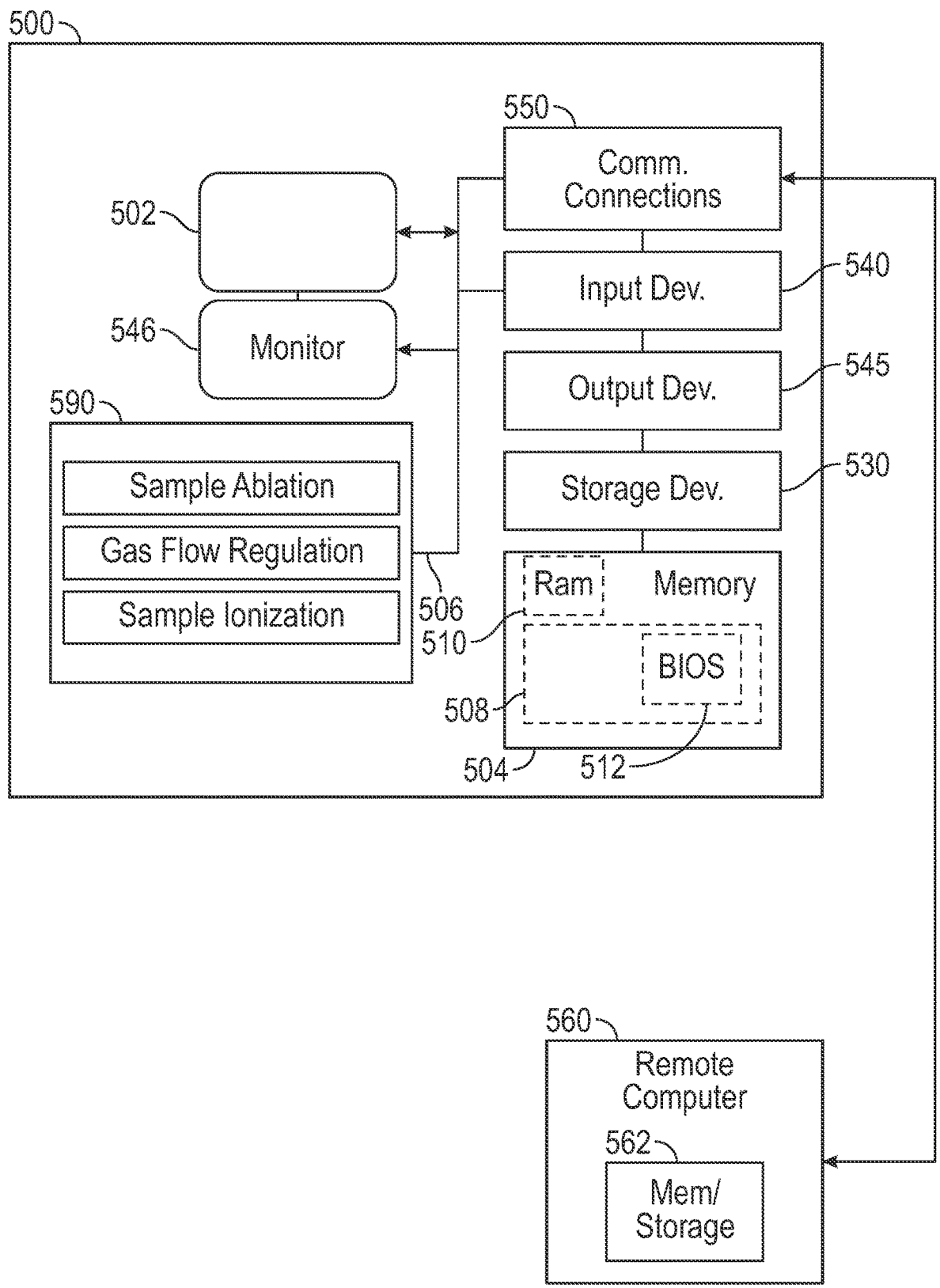
FIG. 5 is a schematic representation of a computing system that may be used to perform one or more methods of the present disclosure according to an example.

FIG. 5 and the following discussion are intended to provide a brief, general description of an exemplary computing environment in which the disclosed technology may be implemented. For example, one or more aspects of the computing system of FIG. 5 may represent and/or correspond to the controller 1500 of FIG. 1A and/or the controller 2500 of FIG. 2. In particular, some or all portions of this computing environment can be used with the above methods and apparatus to, for example, position a sample probe system relative to a sample, control an optical assembly of the sample probe system, control an ionizing unit of the sample probe assembly, regulate one or more gas flows through the sample probe system, and/or perform any portions of the methods disclosed above.

Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, tablets, multiprocessor systems, microprocessor-based or programmable consumer electronics, network PCs, minicomputers, mainframe computers, virtual machines, containerized applications, and the like. The disclosed technology also may be practiced in distributed computing environments where tasks are performed by remote processing devices that are linked through a communications network. In a distributed computing environment, program modules may be located in both local and remote memory storage devices. In some cases, such processing is provided in a CPM system. The disclosed systems can serve to control image acquisition and provide a user interface as well as serve as an image processor.

With reference to FIG. 5, an exemplary system for implementing the disclosed technology includes a general-purpose computing device in the form of an exemplary PC 500, including one or more processing units 502, a system memory 504, and a system bus 506 that couples various system components including the system memory 504 to the one or more processing units 502. The system bus 506 may be any of several types of bus structures including a memory bus or memory controller, a peripheral bus, and a local bus using any of a variety of bus architectures. The exemplary system memory 504 includes read-only memory (ROM) 508 and random-access memory (RAM) 510. A basic input/output system (BIOS) 512, containing the basic routines that help with the transfer of information between elements within the PC 500, is stored in ROM 508. The PC 500 may represent and/or correspond to the controller 1500 of FIG. 1A.

The exemplary PC 500 further includes one or more storage devices 530 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 506 by a hard disk drive interface, a magnetic disk drive interface, and an optical drive interface, respectively. The drives and their associated computer readable media provide nonvolatile storage of computer-readable instructions, data structures, program modules, and other data for the PC 500. Other types of computer-readable media which can store data that is accessible by a PC, such as magnetic cassettes, flash memory cards, solid-state drives, digital video disks, CDs, DVDs, RAMs, ROMs, and the like, may also be used in the exemplary operating environment. A number of program modules may be stored in the storage devices 530 including an operating system, multiple operating systems, virtual operating systems, one or more application programs, other program modules, and/or program data.

The exemplary PC 500 can include various devices configured for user interface. For example, a user may enter commands and information into the PC 500 through one or more input devices 540 such as a keyboard and/or a pointing device such as a mouse. For example, the user may enter commands to initiate image acquisition and/or to initiate one or more methods disclosed herein. Other input devices may include a digital camera, microphone, joystick, game pad, buttons, dials, satellite dish, scanner, or the like. These and other input devices are often connected to the one or more processing units 502 through a serial port interface that is coupled to the system bus 506, but may be connected by other interfaces such as a parallel port, game port, universal serial bus (USB), or wired or wireless network connection. A monitor 546 or other type of display device is also connected to the system bus 506 via an interface, such as a video adapter, and can display, for example, one or more images of a sample or specimen prior to, subsequent to, and/or during performance of one or more methods disclosed herein. The monitor 1246 can also be used to select sections for processing or particular image alignment and alignment procedures such as correlation, feature identification, and preview area selection or other image selection. Other peripheral output devices, such as speakers and printers (not shown), may be included.

The PC 500 may operate in a networked environment using logical connections to one or more remote computers, such as a remote computer 560. In some examples, one or more network or communication connections 550 are included. The remote computer 560 may be another PC, a server, a router, a network PC, and/or a peer device or other common network node, and typically includes many or all of the elements described above relative to the PC 500, although only a memory storage device 562 has been illustrated in FIG. 5. The personal computer 500 and/or the remote computer 560 can be connected to a local area network (LAN) and/or a wide area network (WAN). Such networking environments are commonplace in offices, enterprise wide computer networks, intranets, and the Internet.

As shown in FIG. 5, a memory 590 (or portions of this or other memory) can store processor-executable instructions for sample ablation, for gas flow regulation, for sample ionization, and/or for any other processes described herein. For example, such processor-executable instructions can, when executed by a processor system, cause the PC 500 and/or another component (e.g., any suitable components of the sample probe system 1000 of FIG. 1A, the sample probe system 2000 of FIG. 2, and/or the sample probe system 3000 of FIGS. 3A-3C) to execute any of the methods disclosed herein. In addition, the memory 590 can include processor-executable instructions for setting cross-correlations, image alignment such as image rotation and translation, selection of reference images and regions of interest, and/or recording stage coordinates for alignment. In some examples, processor-executable instructions can produce displayed images showing section identification, processing of preview images, and/or acquisition of additional images.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

Unless otherwise stated, as used herein, the term "substantially" means the listed value and/or property and any value and/or property that is at least 75% of the listed value and/or property. Equivalently, the term "substantially" means the listed value and/or property and any value and/or property that differs from the listed value and/or property by at most 25%. For example, "substantially equal" refers to quantities that are fully equal, as well as to quantities that differ from one another by up to 25%.

The systems, apparatus, and methods described herein should not be construed as limiting in any way. Instead, the present disclosure is directed toward all novel and non-obvious features and aspects of the various disclosed examples, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, and the like may be characterized by qualifying terms such as "lowest," "best," "minimum," "extreme," etc. It is to be understood that such descriptions are intended to indicate that a selection among many used functional alternatives can be made, and such selections need not be better, smaller, or otherwise preferable to other selections.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various examples. Computer-executable instructions for program modules may be executed within a local or distributed computing system. In general, a computing system or computing device can be local or distributed, and can include any combination of special-purpose hardware and/or general-purpose hardware with software implementing the functionality described herein, examples of which include personal computers, hand-held devices, tablets, multiprocessor systems, microprocessor-based or programmable consumer electronics, network PCs, minicomputers, mainframe computers, virtual machines, containerized applications, etc.

In various examples described herein, a module (e.g., component or engine) can be "programmed" and/or "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

Described algorithms may be, for example, embodied as software or firmware instructions carried out by a digital computer. For instance, any of the disclosed methods can be performed by one or more a computers or other computing hardware that is part of a microscopy and/or ion analysis tool. The computers can be computer systems comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid-state drives (e.g., Flash drives)). The one or more processors can execute computer-executable instructions stored on one or more of the tangible, non-transitory computer-readable media, and thereby perform any of the disclosed techniques. For instance, software for performing any of the disclosed examples can be stored on the one or more volatile, non-transitory computer-readable media as computer-executable instructions, which when executed by the one or more processors, cause the one or more processors to perform any of the disclosed techniques or subsets of techniques.

Additional Examples of the Disclosed Technology

Having described and illustrated the principles of the disclosed technology with reference to the illustrated examples, it will be recognized that the illustrated examples can be modified in arrangement and detail without departing from such principles. For instance, elements of examples performed in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

Example 1. A system comprising: a sample transfer assembly configured to receive ablated material ejected from a sample and to convey the ablated material to an ion analyzer, wherein the sample transfer assembly comprises: a sample transfer pipe configured to convey the ablated material to an analyzer inlet of the ion analyzer; and one or more gas inlets disposed upstream of the analyzer inlet, each gas inlet configured to receive a respective gas flow that flows toward the analyzer inlet and that transports the ablated material toward the analyzer inlet, wherein the sample transfer assembly is configured such that a mass flow rate into the analyzer inlet is equal to or greater than a total mass flow rate of the gas flows into the one or more gas inlets.

Example 2. The system of any example herein, particularly example 1, wherein the one or more gas inlets comprises a first gas inlet disposed downstream of at least a portion of the sample transfer pipe, and wherein the first gas inlet is configured to receive a first gas flow that flows into the analyzer inlet.

Example 3. The system of any example herein, particularly any one of examples 1-2, wherein the system is configured such that the first gas flow at least partially entrains the ablated material to flow into the analyzer inlet such that a proportion of the ablated material entering the sample transfer pipe that continues to flow into the analyzer inlet is one or more of at least 50%, at least 60%, at least 70%, at least 80%, at least 90%, 50-99%, 60-99%, 70-99%, 80-99%, or 90-99%.

Example 4. The system of any example herein, particularly any one of examples 1-5, wherein the system is configured such that the ablated material mixes with an ionizing material within the sample transfer pipe to produce a flow of ionized sample particles.

Example 5. The system of any example herein, particularly any one of examples 1-4, wherein the one or more gas inlets comprises a second gas inlet disposed upstream of at least a portion of the sample transfer pipe and configured to receive a second gas flow that flows into the sample transfer pipe.

Example 6. The system of any example herein, particularly example 5, wherein the sample transfer pipe comprises a charge transfer region in which the ablated material is mixed with an ionizing material to ionize the ablated material to produce an ionized sample flow, and wherein the second gas inlet is disposed upstream of the charge transfer region.

Example 7. The system of any example herein, particularly any one of examples 1-6, wherein the sample transfer assembly comprises a sampling capillary configured to receive the ablated material and to convey the ablated material to the sample transfer pipe.

Example 8. The system of any example herein, particularly example 7, wherein the one or more gas inlets comprises a sampling capillary inlet of the sampling capillary configured to receive a third gas flow that flows into the sampling capillary.

Example 9. The system of any example herein, particularly example 8, wherein the sampling capillary is configured to receive the ablated material via the sampling capillary inlet.

Example 10. The system of any example herein, particularly any one of examples 7-9, wherein the sampling capillary and the sample transfer pipe are angled relative to one another by a capillary intersection angle that is approximately 90°.

Example 11. The system of any example herein, particularly any one of examples 7-10, wherein the sampling capillary has a sampling capillary inner diameter that is one or more of at least 0.5 millimeters (mm), at least 1 mm, at least 1.5 mm, at least 2 mm, at least 3 mm, at most 5 mm, at most 2.5 mm, at most 1.7 mm, at most 1.2 mm, at most 0.7 mm, 0.5-1.7 mm, 1-2.5 mm, or 1.5-5 mm.

Example 12. The system of any example herein, particularly any one of examples 7-11, wherein the system is configured such that a sampling capillary inlet of the sampling capillary is separated from the sample by a sample separation distance that is one or more of at least 0.1 mm, at least 0.5, at least 1 mm, at least 1.5 mm, at least 2 mm, at least 3 mm, at most 5 mm, at most 2.5 mm, at most 1.7 mm, at most 1.2 mm, at most 0.7 mm, at most 0.2 mm, 0.1-0.7 mm, 0.5-1.2 mm, 1-1.7 mm, 1.5-2.5 mm, or 2-5 mm.

Example 13. The system of any example herein, particularly any one of examples 7-12, wherein the sampling capillary is configured to convey the ablated material directly to the sample transfer pipe.

Example 14. The system of any example herein, particularly any one of examples 7-13, wherein the sample transfer assembly comprises a sample transfer conduit that comprises the sample transfer pipe, and wherein the sampling capillary is configured to convey the ablated material to the sample transfer conduit.

Example 15. The system of any example herein, particularly example 14, wherein the sample transfer conduit comprises one or more of: a sample transfer conduit first inlet configured to receive an ionizing material; a sample transfer conduit second inlet configured to receive the ablated material; or a sample transfer conduit outlet configured to expel the ablated material to the analyzer inlet.

Example 16. The system of any example herein, particularly example 15, wherein the sample transfer pipe comprises one or more of the sample transfer conduit first inlet, the sample transfer conduit second inlet, or the sample transfer conduit outlet.

Example 17. The system of any example herein, particularly any one of examples 15-16, wherein the sampling capillary is coupled, optionally directly coupled, to the sample transfer conduit second inlet.

Example 18. The system of any example herein, particularly any one of examples 15-17, wherein the sample transfer assembly comprises a sampling conduit that comprises the sampling capillary, and wherein the sampling conduit is coupled, optionally directly coupled, to the sample transfer conduit second inlet.

Example 19. The system of any example herein, particularly any one of examples 14-18, wherein the sample transfer assembly comprises a sampling conduit that comprises the sampling capillary, and wherein the sampling conduit is coupled, optionally directly coupled, to the sample transfer conduit.

Example 20. The system of any example herein, particularly any one of examples 14-19, wherein the sampling conduit comprises a sampling conduit outlet that is coupled to the sample transfer conduit at a capillary intersection angle that is approximately 90°.

Example 21. The system of any example herein, particularly any one of examples 14-20, wherein the sample transfer conduit is configured to receive the ablated material directly from the sample.

Example 22. The system of any example herein, particularly any one of examples 14-21, wherein the sample transfer conduit is at least partially curved between the sample and the analyzer inlet.

Example 23. The system of any example herein, particularly any one of examples 1-22, wherein the sample transfer assembly comprises a sampling capillary, and wherein the sample transfer assembly comprises a capillary junction unit that fluidly couples the sampling capillary and the sample transfer pipe to one another.

Example 24. The system of any example herein, particularly example 23, wherein the sample transfer assembly comprises a sampling conduit that comprises the sampling capillary, wherein the sample transfer assembly comprises a sample transfer conduit that comprises the sample transfer pipe, and wherein the capillary junction unit comprises at least a portion of one or both of the sampling conduit and the sample transfer conduit.

Example 25. The system of any example herein, particularly any one of examples 23-24, wherein the capillary junction unit comprises a sampling capillary interface that couples the sampling capillary to the capillary junction unit.

Example 26. The system of any example herein, particularly example 25, wherein the sampling capillary interface receives the sampling capillary.

Example 27. The system of any example herein, particularly any one of examples 25-26, wherein the sampling capillary is removably coupled to the sampling capillary interface.

Example 28. The system of any example herein, particularly any one of examples 23-27, wherein the capillary junction unit comprises an upstream sample transfer pipe interface that couples the sample transfer pipe to the capillary junction unit.

Example 29. The system of any example herein, particularly example 28, wherein the upstream sample transfer pipe interface receives the sample transfer pipe.

Example 30. The system of any example herein, particularly any one of examples 28-29, wherein the sample transfer pipe is removably coupled to the upstream sample transfer pipe interface.

Example 31. The system of any example herein, particularly any one of examples 28-30, wherein the sample transfer pipe is coupled to the upstream sample transfer pipe interface via an upstream sample transfer pipe adapter.

Example 32. The system of any example herein, particularly example 31, wherein the upstream sample transfer pipe adapter is removably coupled to one or both of the sample transfer pipe and the upstream sample transfer pipe interface.

Example 33. The system of any example herein, particularly any one of examples 31-32, wherein the upstream sample transfer pipe adapter is fixedly coupled to the capillary junction unit.

Example 34. The system of any example herein, particularly any one of examples 23-33, wherein the capillary junction unit comprises a capillary junction unit gas inlet disposed upstream of at least a portion of the sample transfer pipe and configured to receive a capillary junction unit gas flow that flows into the sample transfer pipe.

Example 35. The system of any example herein, particularly example 34, wherein the capillary junction unit comprises an upstream inlet regulator mechanism configured to selectively regulate a second flow rate at which the capillary junction unit gas flow flows into the capillary junction unit gas inlet.

Example 36. The system of any example herein, particularly any one of examples 23-35, wherein the capillary junction unit defines an inner chamber, wherein the system further comprises an ionizing unit configured to introduce an ionizing material into the sample transfer pipe to ionize the ablated material, and wherein the ionizing unit is at least partially received within the inner chamber.

Example 37. The system of any example herein, particularly any one of examples 1-36, wherein the sample transfer assembly comprises an analyzer adapter unit configured such that the ablated material is conveyed from the sample transfer pipe to the analyzer inlet via the analyzer adapter unit.

Example 38. The system of any example herein, particularly example 37, wherein the analyzer adapter unit comprises the first gas inlet.

Example 39. The system of any example herein, particularly any one of examples 37-38, wherein the sample transfer pipe is directly coupled to the analyzer adapter unit.

Example 40. The system of any example herein, particularly any one of examples 37-38, wherein the analyzer adapter unit comprises a downstream sample transfer pipe interface that couples the sample transfer pipe to the analyzer adapter unit.

Example 41. The system of any example herein, particularly example 40, wherein the downstream sample transfer pipe interface receives the sample transfer pipe.

Example 42. The system of any example herein, particularly any one of examples 40-41, wherein the sample transfer pipe is removably coupled to the downstream sample transfer pipe interface.

Example 43. The system of any example herein, particularly any one of examples 40-42, wherein the sample transfer pipe is coupled to the downstream sample transfer pipe interface via a downstream sample transfer pipe adapter.

Example 44. The system of any example herein, particularly example 43, wherein the downstream sample transfer pipe adapter is removably coupled to one or both of the sample transfer pipe and the downstream sample transfer pipe interface.

Example 45. The system of any example herein, particularly any one of examples 37-44, wherein the analyzer adapter unit comprises an analyzer transfer capillary configured to receive the ablated material from the sample transfer pipe and to convey the ablated material to the analyzer inlet.

Example 46. The system of any example herein, particularly example 45, wherein the analyzer transfer capillary is fixedly coupled to at least a portion of the analyzer adapter unit.

Example 47. The system of any example herein, particularly any one of examples 45-46, wherein the analyzer adapter unit comprises a downstream sample transfer pipe interface that couples the sample transfer pipe to the analyzer adapter unit, and wherein the analyzer transfer capillary is fixedly coupled to the downstream sample transfer pipe interface.

Example 48. The system of any example herein, particularly any one of examples 40-47, wherein the analyzer adapter unit comprises a body portion that is fixed relative to the analyzer inlet, and wherein the downstream sample transfer pipe interface is movably coupled to the body portion.

Example 49. The system of any example herein, particularly example 48, wherein the analyzer adapter unit comprises a coupling member via which the downstream sample transfer pipe interface is coupled to the body portion to permit translation of the sample transfer pipe interface relative to the body portion in one or more directions.

Example 50. The system of any example herein, particularly example 49, wherein the analyzer adapter unit comprises an analyzer transfer capillary configured to receive the ablated material from the sample transfer pipe and to convey the ablated material to the analyzer inlet, and wherein the coupling member provides a thermal barrier between the analyzer transfer capillary and the body portion.

Example 51. The system of any example herein, particularly example 50, wherein the coupling member comprises one or more of a membrane, a gasket, or a flexible seal.

Example 52. The system of any example herein, particularly any one of examples 37-51, further comprising an ionizing unit configured to ionize the ablated material, wherein the ionizing unit is at least partially received within the analyzer adapter unit.

Example 53. The system of any example herein, particularly example 52, wherein the ionizing unit is configured to ionize the ablated material as the ablated material flows between the sample transfer pipe and the analyzer inlet.

Example 54. The system of any example herein, particularly any one of examples 1-53, further comprising an ionizing unit configured to introduce an ionizing material into the sample transfer pipe to ionize the ablated material.

Example 55. The system of any example herein, particularly example 54, wherein the ionizing unit comprises an electrospray needle, and wherein the ionizing material comprises charged electrospray droplets.

Example 56. The system of any example herein, particularly any one of examples 54-55, wherein the ionizing unit comprises one or more of an atmospheric-pressure chemical ionization (APCI) source, a low-temperature plasma source, a glow discharge source, a dielectric barrier discharge source, a high-energy photon source, or a high-energy electron source.

Example 57. The system of any example herein, particularly any one of examples 54-56, wherein the system is configured such the ablated material mixes with the ionizing material within the sample transfer pipe to ionize the ablated material.

Example 58. The system of any example herein, particularly any one of examples 1-57, further comprising an optical assembly with a laser source configured to direct a laser beam to a targeted region of the sample to ablate the sample within the targeted region.

Example 59. The system of any example herein, particularly example 58, wherein the laser source comprises a femtosecond laser.

Example 60. The system of any example herein, particularly any one of examples 58-59, wherein the laser beam comprises an infrared laser beam.

Example 61. The system of any example herein, particularly any one of examples 58-60, wherein the laser source is configured to deliver pulse energies of approximately 1 nanojoule (nJ) to approximately 10 microjoules (µJ) per cubic micrometer (µm$^3$) of the sample.

Example 62. The system of any example herein, particularly any one of examples 58-61, wherein the targeted region has a diameter that is one or more of at least 1 µm, at least 5 µm, at least 10 µm, at least 15 µm, at least 20 µm, at least 30 µm, at most 50 µm, at most 25 µm, at most 17 µm, at most 12 µm, at most 7 µm, at most 2 µm, 1-7 µm, 5-12 µm, 10-17 µm, 15-25 µm, or 20-50 µm.

Example 63. The system of any example herein, particularly any one of examples 58-62, wherein the targeted region has a volume that is one or more of at least 2 µm$^3$, at least 5 µm$^3$, at least 10 µm$^3$, at least 50 µm$^3$, at least 100 µm$^3$, at least 300 µm$^3$, at most 500 µm$^3$, at most 200 µm$^3$, at most 70 µm$^3$, at most 20 µm$^3$, at most 7 µm$^3$, at most 3 µm$^3$, 2-7 µm$^3$, 5-20 µm$^3$, 10-70 µm$^3$, 50-200 µm$^3$, or 100-500 µm$^3$.

Example 64. The system of any example herein, particularly any one of examples 58-63, wherein the optical assembly comprises a sample imaging system configured to image a portion of the sample.

Example 65. The system of any example herein, particularly example 64, wherein the optical assembly is configured to direct the laser beam to the sample at least partially along a beam axis, and wherein the sample imaging system is configured to receive light from the sample at least partially along the beam axis.

Example 66. The system of any example herein, particularly example 65, further comprising a sampling capillary configured to receive the ablated material and to convey the ablated material to the sample transfer pipe, wherein the sampling capillary extends along and defines a sampling capillary central axis, and wherein the beam axis is spaced apart from the sampling capillary central axis by a lateral beam offset.

Example 67. The system of any example herein, particularly example 66, wherein the lateral beam offset is one or more of at least 0.2 mm, at least 0.5 mm, at least 1.0 mm, at most 1.5 mm, at most 0.7 mm, at most 0.3 mm, 0.2-0.7 mm, or 0.5-1.5 mm.

Example 68. The system of any example herein, particularly any one of examples 66-67, wherein the sampling capillary has a sampling capillary inner diameter, and wherein the lateral beam offset is one or more of at least 10% of the sampling capillary inner diameter, at least 20% of the sampling capillary inner diameter, at least 30% of the sampling capillary inner diameter, at least 40% of the sampling capillary inner diameter, at most 45% of the sampling capillary inner diameter, at most 35% of the sampling capillary inner diameter, at most 25% of the sampling capillary inner diameter, at most 15% of the sampling capillary inner diameter, 10-25% of the sampling capillary inner diameter, 20-35% of the sampling capillary inner diameter, or 25-45% of the sampling capillary inner diameter.

Example 69. The system of any example herein, particularly any one of examples 64-68, wherein the optical assembly comprises an objective configured to collect light from the sample for imaging by the sample imaging system.

Example 70. The system of any example herein, particularly any one of examples 58-69, further comprising a sample stage having a first side configured for placement of the sample thereon and a second side opposite the first side, wherein the optical assembly is configured to direct the laser beam to the second side of the sample stage.

Example 71. The system of any example herein, particularly any one of examples 58-70, further comprising a sampling capillary configured to receive the ablated material and to convey the ablated material to the sample transfer pipe, wherein the sampling capillary extends along and defines a sampling capillary central axis, and wherein the targeted region is spaced apart from the sampling capillary central axis by a lateral beam offset.

Example 72. The system of any example herein, particularly example 71, wherein the lateral beam offset is one or more of at least 0.2 mm, at least 0.5 mm, at least 1.0 mm, at most 1.5 mm, at most 0.7 mm, at most 0.3 mm, 0.2-0.7 mm, or 0.5-1.5 mm.

Example 73. The system of any example herein, particularly any one of examples 71-72, wherein the sampling capillary has a sampling capillary inner diameter, and wherein the lateral beam offset is one or more of at least 10% of the sampling capillary inner diameter, at least 20% of the sampling capillary inner diameter, at least 30% of the sampling capillary inner diameter, at least 40% of the sampling capillary inner diameter, at most 45% of the sampling capillary inner diameter, at most 35% of the sampling capillary inner diameter, at most 25% of the sampling capillary inner diameter, at most 15% of the sampling capillary inner diameter, 10-25% of the sampling capillary inner diameter, 20-35% of the sampling capillary inner diameter, or 25-45% of the sampling capillary inner diameter.

Example 74. The system of any example herein, particularly any one of examples 1-73, wherein the ion analyzer comprises a mass spectrometer.

Example 75. The system of any example herein, particularly example 74, wherein the mass spectrometer is configured as one or more of a time of flight (TOF) mass spectrometer, an Orbitrap™ mass spectrometer, a linear ion trap mass spectrometer, a quadrupole mass spectrometer, a quadrupole ion trap mass spectrometer, a magnetic sector mass spectrometer, or a Fourier transform ion cyclotron resonance (FTICR) mass spectrometer.

Example 76. The system of any example herein, particularly any one of examples 1-75, wherein the ion analyzer comprises one or more of an optical spectrometer, a PCR machine, or a sequencing machine.

Example 77. The system of any example herein, particularly any one of examples 1-76, wherein the sample transfer pipe has a sample transfer pipe inner diameter that is one or more of at least 0.5 mm, at least 1 mm, at least 1.5 mm, at least 2 mm, at least 3 mm, at most 5 mm, at most 2.5 mm, at most 1.7 mm, at most 1.2 mm, at most 0.7 mm, 0.5-1.2 mm, 1-1.7 mm, 1.5-2.5 mm, or 2-5 mm.

Example 78. The system of any example herein, particularly any one of examples 1-77, wherein the sample transfer assembly comprises a sample transfer pipe heater configured to regulate a temperature of the sample transfer pipe to regulate ionization of the ablated material.

Example 79. The system of any example herein, particularly example 78, wherein the sample transfer pipe heater is directly coupled to the sample transfer pipe.

Example 80. The system of any example herein, particularly any one of examples 1-79, wherein the first gas flow comprises nitrogen gas.

Example 81. The system of any example herein, particularly any one of examples 1-80, further comprising a first regulator mechanism configured to selectively regulate a first flow rate at which the first gas flow flows into the first gas inlet.

Example 82. The system of any example herein, particularly any one of examples 1-81, wherein the one or more gas inlets comprises a second gas inlet disposed upstream of at least a portion of the sample transfer pipe and configured to receive a second gas flow that flows into the sample transfer pipe, and wherein the second gas flow comprises nitrogen gas.

Example 83. The system of any example herein, particularly any one of examples 1-82, wherein the one or more gas inlets comprises a second gas inlet disposed upstream of at least a portion of the sample transfer pipe and configured to receive a second gas flow that flows into the sample transfer pipe, and further comprising a second regulator mechanism configured to selectively regulate a second flow rate at which the second gas flow flows into the second gas inlet.

Example 84. The system of any example herein, particularly any one of examples 1-83, further comprising a sampling capillary configured to receive the ablated material and to convey the ablated material to the sample transfer pipe, wherein the sampling capillary is configured to receive a third gas flow that flows into the sampling capillary.

Example 85. The system of any example herein, particularly example 84, wherein the third gas flow comprises nitrogen gas.

Example 86. The system of any example herein, particularly any one of examples 84-85, further comprising a capillary positioning stage configured to selectively control a position of the sampling capillary relative to the sample, wherein the capillary positioning stage is configured to selectively vary a sample separation distance between a sampling capillary inlet of the sampling capillary and the sample to regulate a third flow rate at which the third gas flow flows into the sampling capillary.

Example 87. The system of any example herein, particularly example 86, wherein the sampling capillary is supported by the capillary positioning stage.

Example 88. The system of any example herein, particularly any one of examples 86-87, wherein the sampling capillary is directly coupled to the capillary positioning stage.

Example 89. The system of any example herein, particularly any one of examples 86-87, wherein the sample transfer assembly comprises a capillary junction unit that fluidly couples the sampling capillary and the sample transfer pipe to one another, and wherein the capillary junction unit is directly coupled to the capillary positioning stage.

Example 90. A method comprising one or more of: ablating a sample to produce ablated material; entraining the ablated material in a sample material flow that comprises the ablated material and that flows within a sample transfer assembly; ionizing the ablated material to produce ionized sample particles; or conveying the ionized sample particles to an analyzer inlet of an ion analyzer, wherein the entraining the ablated material in the sample material flow comprises flowing a downstream inlet gas flow into the analyzer inlet to at least partially induce the sample material flow.

Example 91. The method of any example herein, particularly example 90, wherein the entraining the ablated material in the sample material flow is performed such that the sample material flow is laminar within at least a portion of the sample transfer assembly.

Example 92. The method of any example herein, particularly any one of examples 90-91, wherein the sample transfer assembly comprises a sampling conduit and a sample transfer conduit, wherein the entraining the ablated material in the sample flow comprises receiving the ablated material into the sampling conduit, and wherein the ionizing the ablated material is performed within the sample transfer conduit.

Example 93. The method of any example herein, particularly example 92, wherein the entraining the ablated material in the sample material flow is performed such that the sample material flow is laminar within one or both of the sampling conduit and the sample transfer conduit.

Example 94. The method of any example herein, particularly any one of examples 92-93, wherein the sampling conduit comprises a sampling capillary, and wherein the entraining the ablated material in the sample flow comprises flowing a sampling capillary gas flow into the sampling capillary.

Example 95. The method of any example herein, particularly example 94, wherein the flowing the sampling capillary gas flow into the sampling capillary is performed passively.

Example 96. The method of any example herein, particularly any one of examples 94-95, further comprising adjusting a flow rate of the sampling capillary gas flow.

Example 97. The method of any example herein, particularly example 96, wherein the adjusting the flow rate of the sampling capillary gas flow comprises adjusting a sample separation distance between the sampling capillary and the sample.

Example 98. The method of any example herein, particularly any one of examples 90-97, wherein the sample transfer assembly comprises a sample transfer conduit, and wherein the entraining the ablated material in the sample flow comprises flowing a sample transfer conduit gas flow into the sample transfer conduit.

Example 99. The method of any example herein, particularly example 98, wherein the flowing the sample transfer conduit gas flow into the sample transfer conduit is performed passively.

Example 100. The method of any example herein, particularly any one of examples 98-99, further comprising adjusting a flow rate of the sample transfer conduit gas flow.

Example 101. The method of any example herein, particularly example 100, wherein the sample transfer assembly comprises a sample transfer conduit upstream gas inlet configured to receive the sample transfer conduit gas flow and an upstream inlet regulator mechanism configured to selectively regulate the flow rate of the sample transfer conduit gas flow, and wherein the adjusting the flow rate of the sample transfer conduit gas flow is performed with the upstream inlet regulator mechanism, optionally with a controller that transmits a command to the upstream inlet regulator mechanism.

Example 102. The method of any example herein, particularly any one of examples 90-101, wherein the flowing the downstream inlet gas flow into the analyzer inlet is performed passively.

Example 103. The method of any example herein, particularly any one of examples 90-102, further comprising adjusting a flow rate of the downstream inlet gas flow.

Example 104. The method of any example herein, particularly example 103, wherein the sample transfer assembly comprises a sample transfer conduit downstream gas inlet configured to receive the downstream inlet gas flow and a downstream inlet regulator mechanism configured to selectively regulate the flow rate of the downstream inlet gas flow, and wherein the adjusting the flow rate of the downstream inlet gas flow is performed with the downstream inlet regulator mechanism, optionally with a controller that transmits a command to the downstream inlet regulator mechanism.

Example 105. The method of any example herein, particularly any one of examples 90-104, wherein the sample transfer assembly comprises a sample transfer conduit, and wherein the ionizing the ablated material is performed within the sample transfer conduit.

Example 106. The method of any example herein, particularly example 105, wherein the ionizing the ablated material comprises mixing the ablated material with an ionizing material.

Example 107. The method of any example herein, particularly example 106, wherein the ionizing material comprises electrospray droplets produced by an electrospray needle.

Example 108. The method of any example herein, particularly any one of examples 106-107, wherein the ionizing material is produced by an ionizing unit that comprises one or more of an atmospheric-pressure chemical ionization (APCI) source, a low-temperature plasma source, a glow discharge source, a dielectric barrier discharge source, a high-energy photon source, or a high-energy electron source.

Example 109. The method of any example herein, particularly any one of examples 90-108, wherein the sample transfer assembly comprises a sample transfer conduit, and wherein the ionizing the ablated material is performed downstream of the sample transfer conduit.

Example 110. The method of any example herein, particularly any one of examples 90-108, wherein the sample transfer assembly comprises an analyzer adapter unit configured such that the ablated material is conveyed from the sample transfer conduit to the analyzer inlet via the analyzer adapter unit, and wherein the ionizing the ablated material is performed within the analyzer adapter unit.

Example 111. The method of any example herein, particularly any one of examples 90-110, wherein the ablating the sample comprises ablating with a laser source.

Example 112. The method of any example herein, particularly example 111, wherein the laser source directs a laser beam to an opposite side of the sample than that at which the ablated material flows into the sample transfer assembly.

Example 113. The method of any example herein, particularly example 111, wherein the laser source directs a laser beam to the same side of the sample as that at which the ablated material flows into the sample transfer assembly.

Example 114. The method of any example herein, particularly any one of examples 111-113, wherein the ablating the sample with the laser source comprises ablating with femtosecond laser pulses.

Example 115. The method of any example herein, particularly any one of examples 90-114, wherein the entraining the ablated material comprises generating a motive gas flow downstream of the analyzer inlet.

Example 116. The method of any example herein, particularly example 115, wherein the motive gas flow is at least partially generated by the ion analyzer.

Example 117. The method of any example herein, particularly any one of examples 115-116, wherein the motive gas flow at least partially induces the downstream inlet gas flow.

Example 118. The method of any example herein, particularly any one of examples 115-117, wherein the sample transfer assembly comprises a sample transfer conduit, wherein the entraining the ablated material in the sample flow comprises flowing a sample transfer conduit gas flow into the sample transfer conduit, and wherein the motive gas flow at least partially induces the sample transfer conduit gas flow.

Example 119. The method of any example herein, particularly any one of examples 115-118, wherein the sampling conduit comprises a sampling capillary, wherein the entraining the ablated material in the sample flow comprises flowing a sampling capillary gas flow into the sampling capillary, and wherein the motive gas flow at least partially induces the sampling capillary gas flow.

Example 120. A computer-readable medium comprising stored processor-executable instructions that, when executed by a processor, cause the processor to perform the method of any one of examples 1-119.

In view of the many possible examples in which the principles of the disclosed technology may be applied, it should be recognized that the illustrated examples are only preferred examples and should not be taken as limiting the scope of the disclosed technology. Rather, the scope is defined by the following claims. We therefore claim all that comes within the scope of these claims.

We claim:
1. A system comprising:
a sample transfer assembly configured to receive ablated material ejected from a sample and to convey the ablated material to an ion analyzer, wherein the sample transfer assembly comprises:
a sample transfer pipe configured to convey the ablated material to an analyzer inlet of the ion analyzer; and
one or more gas inlets disposed upstream of the analyzer inlet, each gas inlet configured to receive a respective gas flow that flows toward the analyzer inlet and that transports the ablated material toward the analyzer inlet, wherein the sample transfer assembly is configured such that a mass flow rate into the analyzer inlet is equal to or greater than a total mass flow rate of the gas flows into the one or more gas inlets.

2. The system of claim 1, wherein the one or more gas inlets comprises a first gas inlet disposed downstream of at least a portion of the sample transfer pipe, and wherein the first gas inlet is configured to receive a first gas flow that flows into the analyzer inlet.

3. The system of claim 1, wherein the one or more gas inlets comprises a second gas inlet disposed upstream of at least a portion of the sample transfer pipe and configured to receive a second gas flow that flows into the sample transfer pipe.

4. The system of claim 1, wherein the sample transfer assembly comprises a sampling capillary configured to receive the ablated material and to convey the ablated material to the sample transfer pipe, wherein the one or more gas inlets comprises a sampling capillary inlet of the sampling capillary configured to receive a third gas flow that flows into the sampling capillary, and wherein the sampling capillary is configured to receive the ablated material via the sampling capillary inlet.

5. The system of claim 4, wherein the sampling capillary and the sample transfer pipe are angled relative to one another by a capillary intersection angle that is approximately 90°.

6. The system of claim 4, wherein the sample transfer assembly comprises a capillary junction unit that fluidly couples the sampling capillary and the sample transfer pipe to one another.

7. The system of claim 6, wherein the capillary junction unit comprises a second gas inlet of the one or more gas inlets disposed upstream of at least a portion of the sample transfer pipe and configured to receive a second gas flow that flows into the sample transfer pipe.

8. The system of claim 6, wherein the capillary junction unit defines an inner chamber, wherein the system further comprises an ionizing unit configured to introduce an ionizing material into the sample transfer pipe to ionize the ablated material, and wherein the ionizing unit is at least partially received within the inner chamber.

9. The system of claim 8, wherein the ionizing unit comprises an electrospray needle.

10. The system of claim 1, wherein the one or more gas inlets comprises a first gas inlet disposed downstream of at least a portion of the sample transfer pipe, wherein the sample transfer assembly comprises an analyzer adapter unit configured such that the ablated material is conveyed from the sample transfer pipe to the analyzer inlet via the analyzer adapter unit, and wherein the analyzer adapter unit comprises the first gas inlet.

11. The system of claim 10, further comprising an ionizing unit configured to ionize the ablated material, wherein the ionizing unit is at least partially received within the analyzer adapter unit.

12. The system of claim 1, further comprising:
an optical assembly with a laser source configured to direct a laser beam to a targeted region of the sample to ablate the sample within the targeted region; and
a sample stage having a first side configured for placement of the sample thereon and a second side opposite the first side, wherein the optical assembly is configured to direct the laser beam to the second side of the sample stage.

13. A method comprising:
ablating a sample to produce ablated material;
entraining the ablated material in a sample material flow that comprises the ablated material and that flows within a sample transfer assembly;
ionizing the ablated material to produce ionized sample particles; and
conveying the ionized sample particles to an analyzer inlet of an ion analyzer such that a mass flow rate into the analyzer inlet is equal to or greater than a mass flow rate of the sample material flow,
wherein the entraining the ablated material in the sample flow comprises flowing an downstream inlet gas flow into the analyzer inlet to at least partially induce the sample material flow, and wherein the entraining the ablated material in the sample material flow is performed such that the sample material flow is laminar within at least a portion of the sample transfer assembly.

14. The method of claim 13, wherein the sample transfer assembly comprises a sample transfer conduit downstream gas inlet configured to receive the downstream inlet gas flow and a downstream inlet regulator mechanism configured to selectively regulate a flow rate of the downstream inlet gas flow, and wherein the method further comprises adjusting the flow rate of the downstream inlet gas flow with the downstream inlet regulator mechanism.

15. The method of claim 13, wherein the sample transfer assembly comprises a sampling capillary, wherein the entraining the ablated material in the sample flow comprises flowing a sampling capillary gas flow into the sampling capillary, and wherein the method further comprises adjusting a flow rate of the sampling capillary gas flow by adjusting a sample separation distance between the sampling capillary and the sample.

16. The method of claim 13, further comprising adjusting a flow rate of the downstream inlet gas flow.

17. The method of claim 13, wherein the sample transfer assembly comprises a sample transfer conduit, and wherein the ionizing the ablated material is performed within the sample transfer conduit.

18. The method of claim 13, wherein the sample transfer assembly comprises a sample transfer conduit, and wherein the ionizing the ablated material is performed downstream of the sample transfer conduit.

19. A computer-readable medium comprising stored processor-executable instructions that, when executed by a processor, cause the processor to:
regulate a flow rate of a sample material flow that is induced to flow within a sample transfer assembly by at least a sampling capillary gas flow and an downstream inlet gas flow such that the sample material flow is laminar within at least a portion of the sample transfer assembly,
wherein the sample material flow comprises ablated material that is ablated from a sample and entrained into the sample material flow and that is directed into an analyzer inlet of an ion analyzer, and wherein the regulating the flow rate is performed such that a mass flow rate into the analyzer inlet is equal to or greater than a total mass flow rate of the sampling capillary gas flow and the downstream inlet gas flow.

20. The computer-readable medium of claim 19, wherein the processor-executable instructions, when executed by the processor, further cause the processor to one or both of:

(i) adjust a flow rate of the sample material flow by transmitting a command to a movement stage to adjust a sample separation distance between a sampling capillary and the sample; and (i) adjust a flow rate of the downstream inlet gas flow by transmitting a command to a downstream inlet regulator mechanism that selectively regulates a flow rate of the downstream inlet gas flow through a sample transfer conduit downstream gas inlet.

\* \* \* \* \*